US010298083B2

(12) United States Patent
Okamoto et al.

(10) Patent No.: US 10,298,083 B2
(45) Date of Patent: May 21, 2019

(54) ROTATING ELECTRICAL MACHINE EQUIPPED WITH A STATOR HAVING A BUS BAR WRAPPED WITH INSULATION SHEET/LAYERS

(75) Inventors: Shogo Okamoto, Chiyoda-ku (JP); Masashi Nakamura, Chiyoda-ku (JP); Akihiro Yamamura, Chiyoda-ku (JP); Yasuhiro Hayasaka, Chiyoda-ku (JP); Sho Nakano, Chiyoda-ku (JP); Yoshiaki Kitta, Chiyoda-ku (JP); Masaya Inoue, Chiyoda-ku (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 414 days.

(21) Appl. No.: 14/371,240

(22) PCT Filed: Jun. 19, 2012

(86) PCT No.: PCT/JP2012/065580

§ 371 (c)(1),
(2), (4) Date: Jul. 9, 2014

(87) PCT Pub. No.: WO2013/145344

PCT Pub. Date: Oct. 3, 2013

(65) Prior Publication Data

US 2015/0162796 A1 Jun. 11, 2015

(30) Foreign Application Priority Data

Mar. 27, 2012 (JP) ................................ 2012-071801

(51) Int. Cl.

| | |
|---|---|
| ***H02K 3/00*** | (2006.01) |
| ***H02K 3/38*** | (2006.01) |

(Continued)

(52) U.S. Cl.

CPC ................. *H02K 3/38* (2013.01); *H02K 3/28* (2013.01); *H02K 3/522* (2013.01); *H02K 3/50* (2013.01); *H02K 2203/09* (2013.01)

(58) Field of Classification Search

CPC H02K 3/30; H02K 3/32; H02K 3/325; H02K 3/34; H02K 3/345; H02K 3/40;

(Continued)

(56) References Cited

U.S. PATENT DOCUMENTS 3,723,797 A * 3/1973 Andersson ............... H01B 3/04 174/117 FF
4,160,926 A * 7/1979 Cope ..................... H02K 3/345 174/110 N (Continued)

FOREIGN PATENT DOCUMENTS

JP 05-064386 A 3/1993
JP 2008-022620 A 1/2008

(Continued)

OTHER PUBLICATIONS

JP2008022620 Foreign Reference with English Translations copy supplied with "N" reference above.*

(Continued)

*Primary Examiner* — Thomas Truong
*Assistant Examiner* — Maged M Almawri
(74) *Attorney, Agent, or Firm* — Sughrue Mion, PLLC; Richard C. Turner

(57) ABSTRACT

A stator includes multiple bus bars formed in an annular shape and laminated in a radial direction and an insulation member covering both radial side surfaces and both axial end faces of each bus bar, and the insulation member contains a sheet-like insulation member covering both radial side surfaces and the axial end face of each bus bar.

9 Claims, 21 Drawing Sheets

(51) Int. Cl.
*H02K 3/52* (2006.01)
*H02K 3/28* (2006.01)
*H02K 3/50* (2006.01)

(58) Field of Classification Search
CPC ........ H02K 3/28; H02K 3/52; H02K 2203/09; H02K 3/04; H02K 3/522; H02K 3/521; H02K 3/46
USPC ....... 310/201, 196, 71; 174/110, 137 R, 148, 174/149 R, 149 B
See application file for complete search history.

(56) References Cited

U.S. PATENT DOCUMENTS 4,329,538 A * 5/1982 Meyer ...................... H02K 3/34 174/117 FF
5,175,396 A * 12/1992 Emery ..................... H02K 3/40 174/120 SC
6,147,432 A * 11/2000 Kusase .................... H02K 3/50 310/179
6,600,244 B2 * 7/2003 Okazaki ................. H02K 3/522 310/71
6,724,118 B2 * 4/2004 Emery ..................... H02K 3/40 174/120 R
7,514,829 B2 * 4/2009 Otsuji .................. H01R 25/161 310/71
8,278,795 B2 * 10/2012 Emery ..................... H02K 3/40 310/196
2003/0173842 A1 * 9/2003 Kobayashi ......... H02K 15/0056 310/71
2006/0068617 A1 * 3/2006 Migita ................... H02K 3/522 439/76.2
2009/0184600 A1 * 7/2009 Baumann ................. H02K 3/40 310/196
2010/0187923 A1 * 7/2010 Migita ................... H02K 3/522 310/71
2010/0244615 A1 * 9/2010 Kouda ..................... H02K 3/34 310/215
2011/0018376 A1 * 1/2011 Kataoka ................. H02K 3/522 310/71
2012/0001514 A1 * 1/2012 Baumann ................. H02K 3/40 310/215
2012/0038239 A1 * 2/2012 Ikeda ....................... H01B 3/04 310/215
2012/0238142 A1 * 9/2012 Chamberlin ............. H02K 3/34 439/626
2013/0069461 A1 * 3/2013 Arai ....................... H02K 3/522 310/71
2013/0221790 A1 * 8/2013 Reid ........................ H02K 3/40 310/196
2014/0375156 A1 * 12/2014 Sugiura .................... H02K 3/12 310/71

FOREIGN PATENT DOCUMENTS

JP 2008022620 * 1/2008
JP 2008-220086 A 9/2008
JP 2010-063273 A 3/2010
JP 2010-178436 A 8/2010

OTHER PUBLICATIONS

Communication dated Jan. 20, 2015, issued by the Japan Patent Office in corresponding Japanese Application No. 2014-507306.
Communication dated Feb. 22, 2016, issued by the State Intellectual Property Office of the P.R.C. in corresponding Chinese Application No. 201280071743.7.
International Search Report of PCT/JP2012/065580 dated Aug. 21, 2012 [PCT/ISA/210].
Communication dated Nov. 1, 2016, issued by the State Intellectual Property Office of the P.R.C. in corresponding Chinese Application No. 201280071743.7.
Communication dated Sep. 12, 2017 from the State Intellectual Property Office of the P.R.C. in counterpart application No. 201280071743.7.
Communication dated Oct. 23, 2018 from the State Intellectual Property Office of the P.R.C. in counterpart Chinese application No. 201280071743.7.

* cited by examiner

ROTATING ELECTRICAL MACHINE EQUIPPED WITH A STATOR HAVING A BUS BAR WRAPPED WITH INSULATION SHEET/LAYERS

CROSS REFERENCE TO RELATED APPLICATIONS

This is a National Stage of International Application No. PCT/JP2012/065580 filed Jun. 19, 2012, claiming priority based on Japanese Patent Application No. 2012-071801 filed Mar. 27, 2012, the contents of all of which are incorporated herein by reference in their entirety.

TECHNICAL FIELD

The present invention relates to a stator having a structure to electrically isolate multiple bus bars from one another and to a rotating electrical machine equipped with the same.

BACKGROUND ART

A stator in a three-phase brushless motor is formed of a stator core, which is an iron core, a coil wound around an outer periphery of teeth of the stator core, bus bars electrically connected to an end of the coil, and an insulation holder holding the bus bars while electrically isolating one from another and disposed at an end of the stator core. As such a stator, a stator described, for example, in PTL 1 is proposed.

The stator described in PTL 1 is a stator including multiple bus bars formed in an annular shape and an insulation holder holding the bus bars installed in lamination in a radial direction and having partition wall portions between one bus bar and another. The insulation holder is formed in such a manner that a creeping distance along a surface (exposed surface) of the insulation holder (insulation material) between the bus bars becomes longer than a spatial distance, which is a shortest distance between the bus bars, along the entire circumference. Because the partition wall portions of the insulation holder are formed in such a manner that the creeping distance between the bus bars becomes longer than the spatial distance along the entire circumference, this stator can suppress a short circuit between the bus bars effectively even when conductive dirt or dust adheres onto the surface of the insulation holder, and therefore makes it possible to secure insulation reliability between the bus bars.

CITATION LIST

Patent Literature

PTL 1: JP-A-2010-63273 (FIG. 3)

SUMMARY OF INVENTION

Technical Problem

The stator described in PTL 1 secures insulation between the bus bars due to the interposition of the insulation holder having the partition wall portions between one bus bar and another. However, for example, when the partition wall portions are made thinner to reduce a size of the stator, poor filling occurs more often during the molding. Accordingly, insulation between the bus bars may possibly be deteriorated and there is a limit to a size reduction by molding the partition wall portions thinner. Also, according to PTL 1, the partition wall portions are in contact with lower parts of the bus bars and convex portions protruding in an axial direction are formed above the partition wall portions so as to be spaced part from upper parts of the bus bars (see FIG. 3 of PTL 1). Owing to these partition wall portions, the creeping distance between the bus bars becomes longer than the spatial distance along the entire circumference. However, in order to secure the creeping distance, a space is necessary between the bus bar and the convex portion. Accordingly, in addition to the partition wall portion, this space is necessary between the bus bars. Hence, there is a problem that a size reduction of the stator is limited, and consequently, a size reduction of a motor is limited.

The invention was devised to solve the problem discussed above and has an object to provide a stator that can be more compact while maintaining insulation reliability between bus bars and a rotating electrical machine equipped with the stator.

Solution to Problem

A stator according to the invention includes multiple bus bars formed in an annular shape and laminated in a radial direction and an insulation member covering both radial side surfaces and both axial end faces of each bus bar, and is characterized in that the insulation member contains a sheet-like insulation member covering the both radial side surfaces and at least one of the axial end faces of each bus bar.

Advantageous Effects of Invention

According to the invention, it becomes possible to provide a stator that can be more compact while maintaining insulation reliability between bus bars and a rotating electrical machine equipped with the stator.

DESCRIPTION OF EMBODIMENTS

First Embodiment

Figure 1:
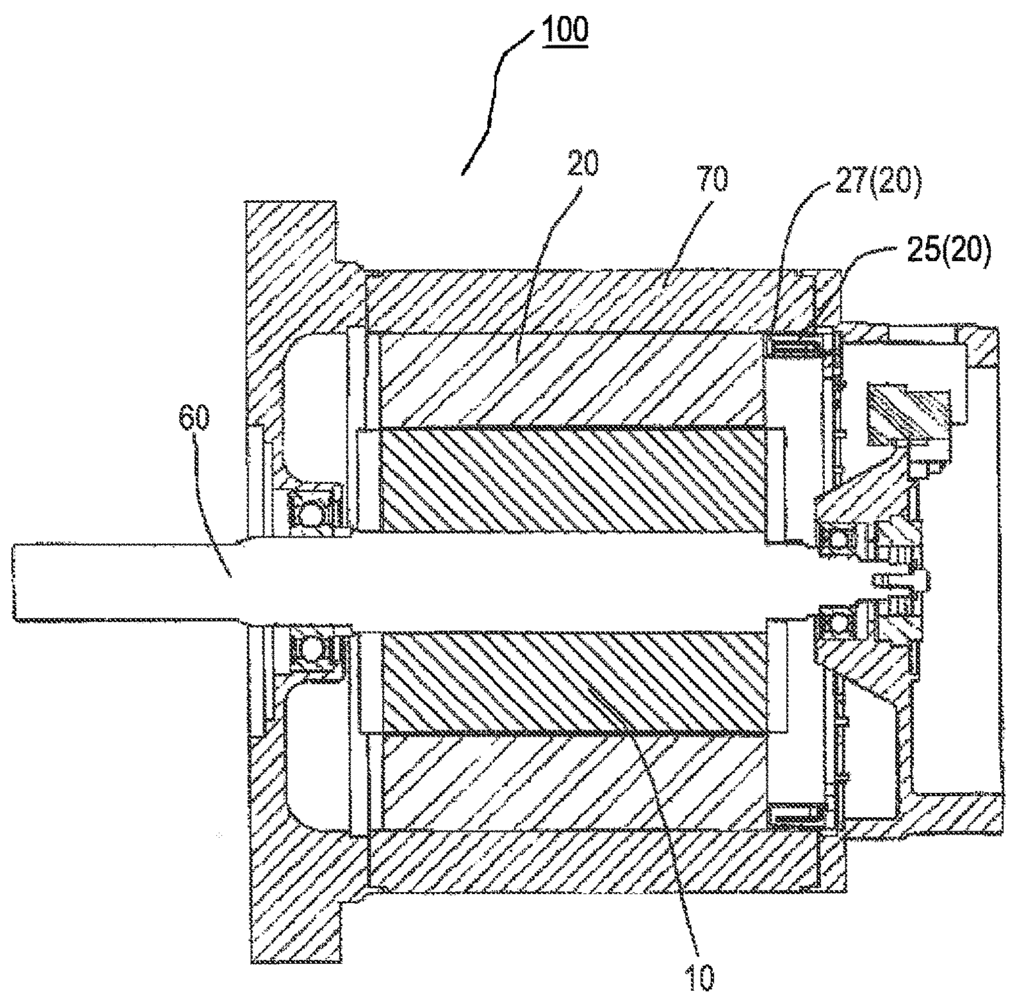
FIG. 1 is a cross section of a rotating electrical machine 100 according to a first embodiment of the invention.
Figure 2:
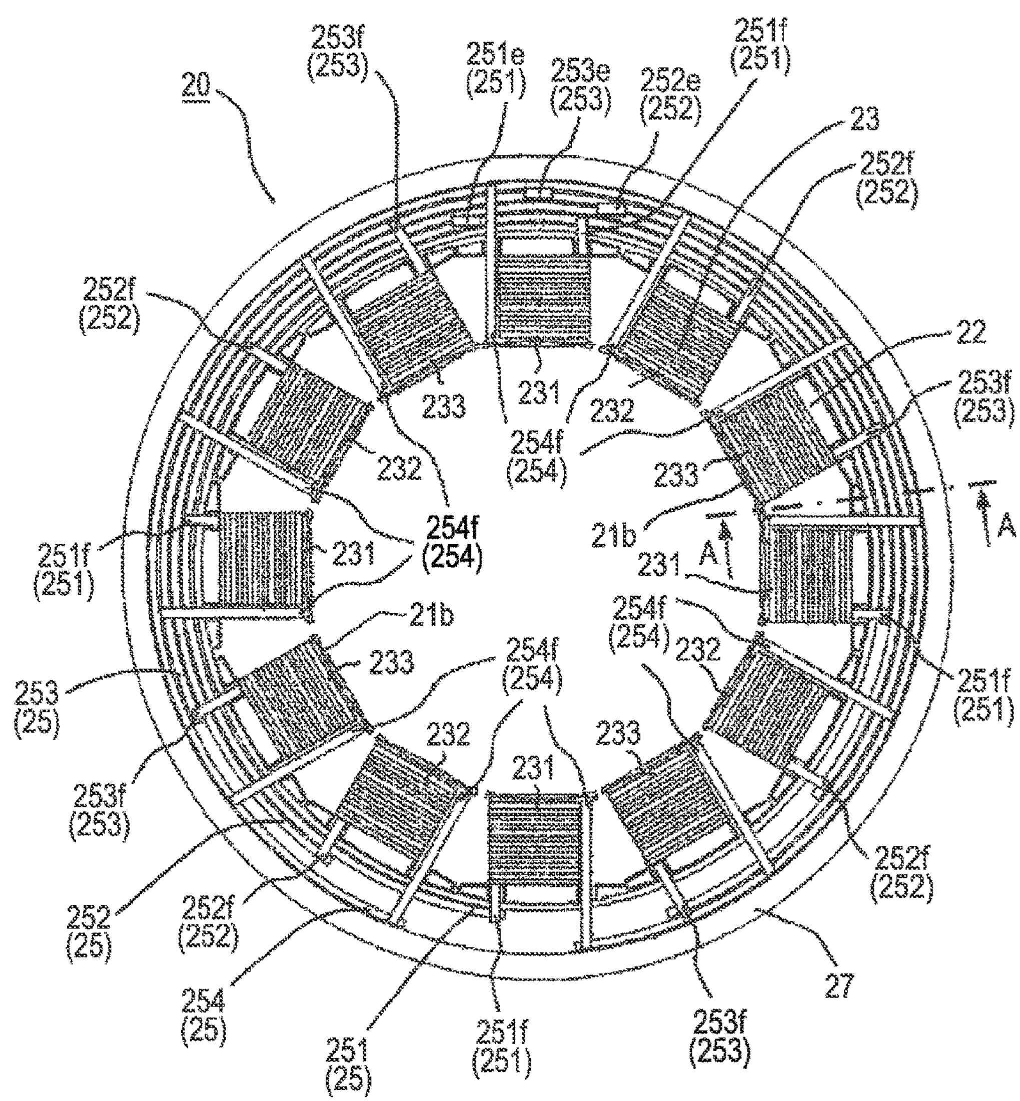
FIG. 2 is a plan view of a stator 20 of FIG. 1.
Figure 3:
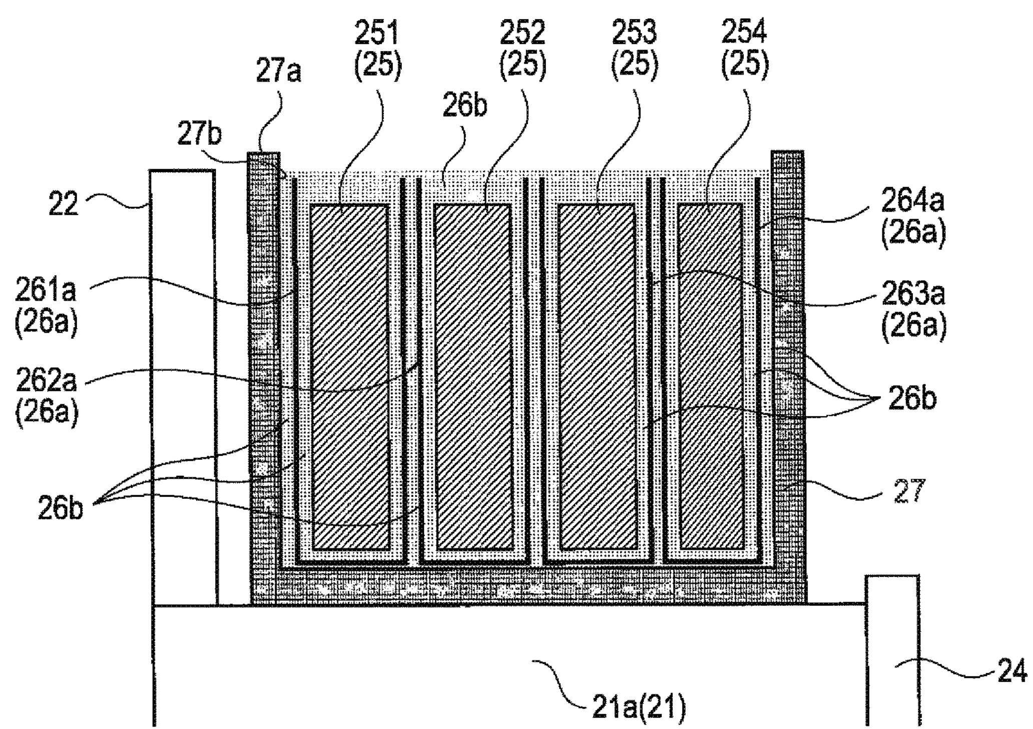
FIG. 3 is a cross section taken along the line A-A of FIG. 2.
Figure 4:
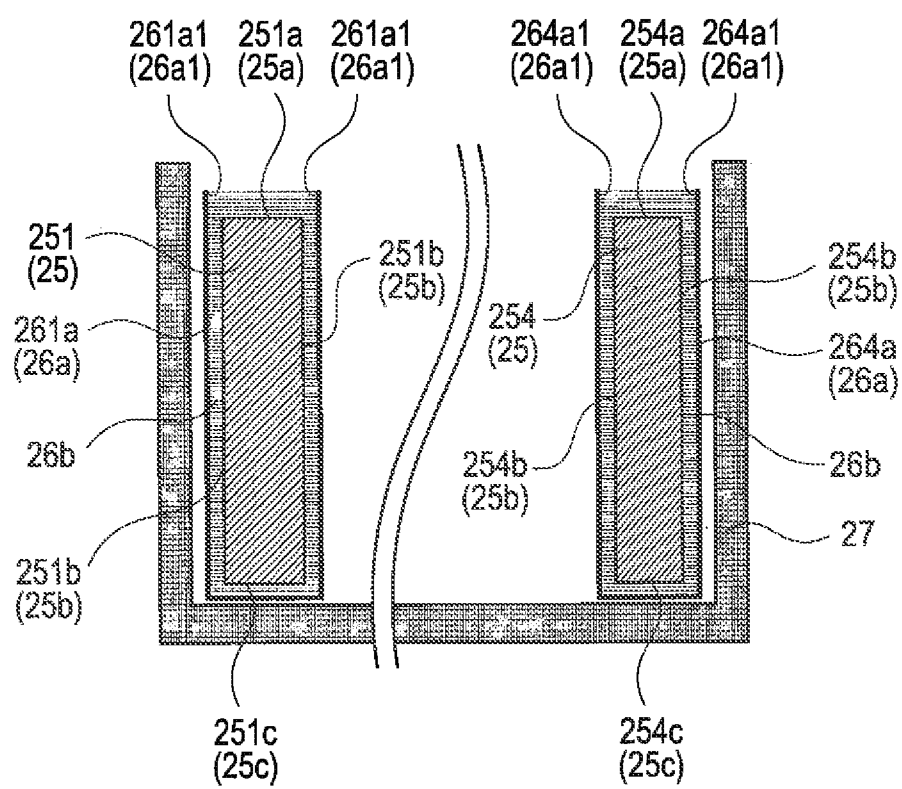
FIG. 4 is a cross section of a peripheral portion of bus bars 251 and 254 of FIG. 3.

Hereinafter, a first embodiment of the invention will be described according to FIG. 1 through FIG. 14. A description will be given by labeling same or equivalent members and portions with same reference numerals in the respective drawings. FIG. 1 is a cross section of a rotating electrical machine 100 equipped with a stator 20 according to the first embodiment of the invention. FIG. 2 is a plan view schematically showing a configuration of the stator 20 of the rotating electrical machine 100 shown in FIG. 1. FIG. 3 is a cross section taken along the line A-A of FIG. 2. FIG. 4 is a cross section taken along the line A-A of FIG. 2 as with FIG. 3 and showing a peripheral portion of bus bars 251 and 254 for ease of description of the invention. The rotating electrical machine 100 shown in FIG. 1 includes a rotor 10 and the stator 20 and an outer peripheral surface of the rotor 10 opposes an inner peripheral surface of the stator 20 with a predetermined clearance in between. The rotor 10 is fixed to a rotor shaft 60. The stator 20 is fit together with a cylindrical frame 70 and has bus bars 25 described below and a holder 27 holding the bus bars 25. Hereinafter, components forming the stator 20 according to the first embodiment of the invention will be described in detail with reference to FIG. 2 through FIG. 4.

The stator 20 has a stator core 21 formed in annular shape, a bobbin 22 attached to the stator core 21, a stator coil 23 wound around an outer periphery of the stator core 21, a core holder 24 holding the stator core 21, multiple bus bars 25 electrically connected to one end of the stator coil 23, an insulation member 26 covering each bus bar 25, and the holder 27 holding the bus bars 25.

The stator core 21 is made up of multiple teeth portions 21*b* protruding from an inner peripheral side of an annular yoke portion 21*a* at regular intervals, and multiple divided cores, which are divided at the yoke portion 21*a* for each teeth portion 21*b*, are combined in an annular shape and press-fit in the core holder 24. The bobbin 22 is a bobbin-shaped insulation member that electrically isolates the stator coil 23 from the stator core 21 and attached to the teeth portion 21*b* of the stator core 21. The bobbin 22 may be formed integrally with the holder 27. The stator coil 23 is a winding wire wound around the outer periphery of the bobbin 22 attached to the stator core 21 and generates a rotating field to rotate the rotor 10. An end of the stator coil 23 is electrically and mechanically connected to one of the corresponding bus bars 25. The core holder 24 is a ring-shaped holder holding the stator core 21 from the outer peripheral side and from one side in the axial direction of the rotating electrical machine 100.

Figure 6:
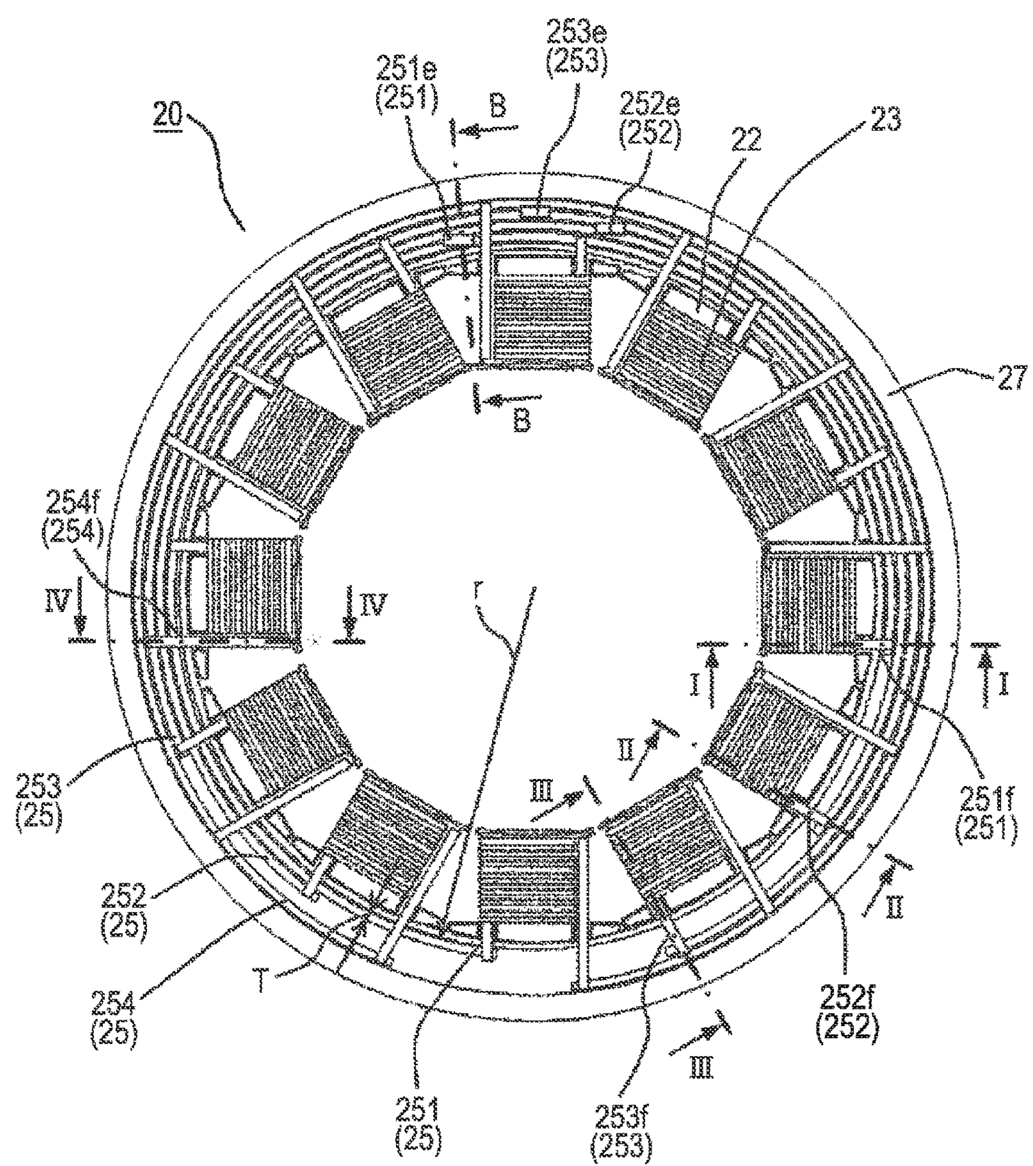
FIG. 6 is a plan view of the stator 20 shown to describe the invention.

The bus bar 25 is a conductive member made of copper or copper alloy and formed in a ring shape (annular shape) and is made up of a U-phase bus bar 251, a V-phase bus bar 252, and a W-phase bus bar 253 corresponding to respective phases (phase U, phase V, and phase W) of the stator coil 23, and a neutral point bus bar 254 corresponding to a neutral point. As is shown in FIG. 2, the U-phase bus bar 251 is positioned on the inner side and the V-phase bus bar 252, the W-phase bus bar 253, and the neutral point bus bar 254 are sequentially laminated in a radial direction. An axial end face 25*a* of the bus bar 25 (end face on the opposite side to the holder 27) is provided with terminal portions 25*e* and 25*f* protruding in the axial direction. Hereinafter, terminal portions 251*e* through 253*e* and 251*f* through 254*f* provided to the bus bars 251 through 254 will be described in detail with reference to FIG. 6 through FIG. 11. FIG. 6 is a plan view of the stator 20 as with FIG. 2. FIG. 7 through FIG. 11 are a cross section taken along the line B-B, a cross section taken along the line I-I, a cross section taken along the line II-II, a cross section taken along the line III-III, and a cross section taken along the line IV-IV of FIG. 6, respectively.

Figure 7:
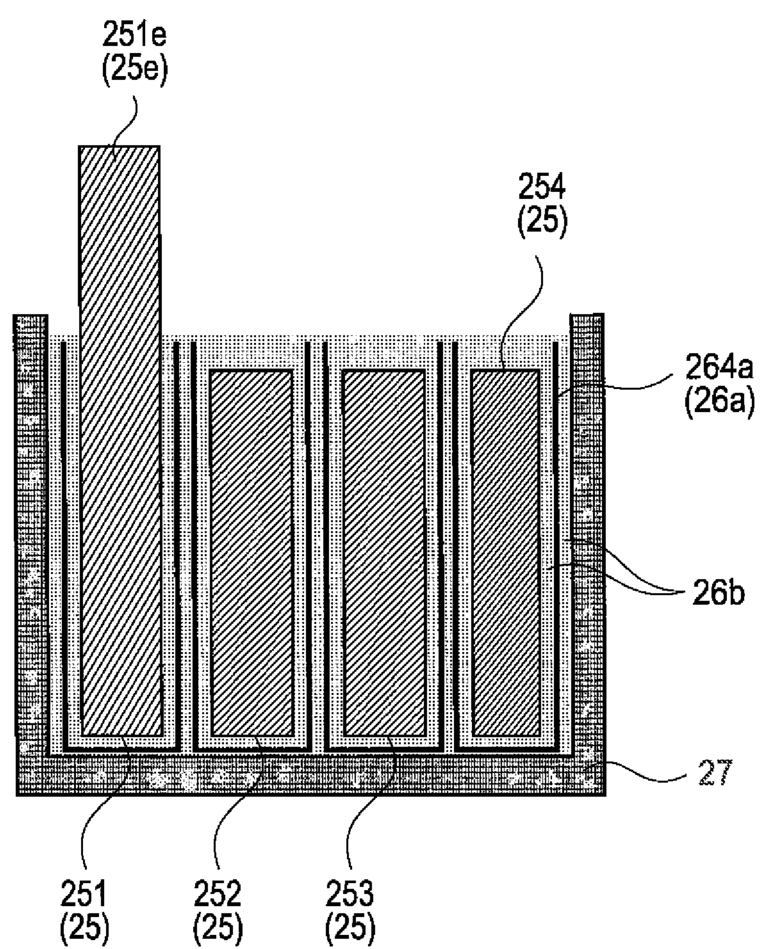
FIG. 7 is a cross section taken along the line B-B of FIG. 6.
Figure 8:
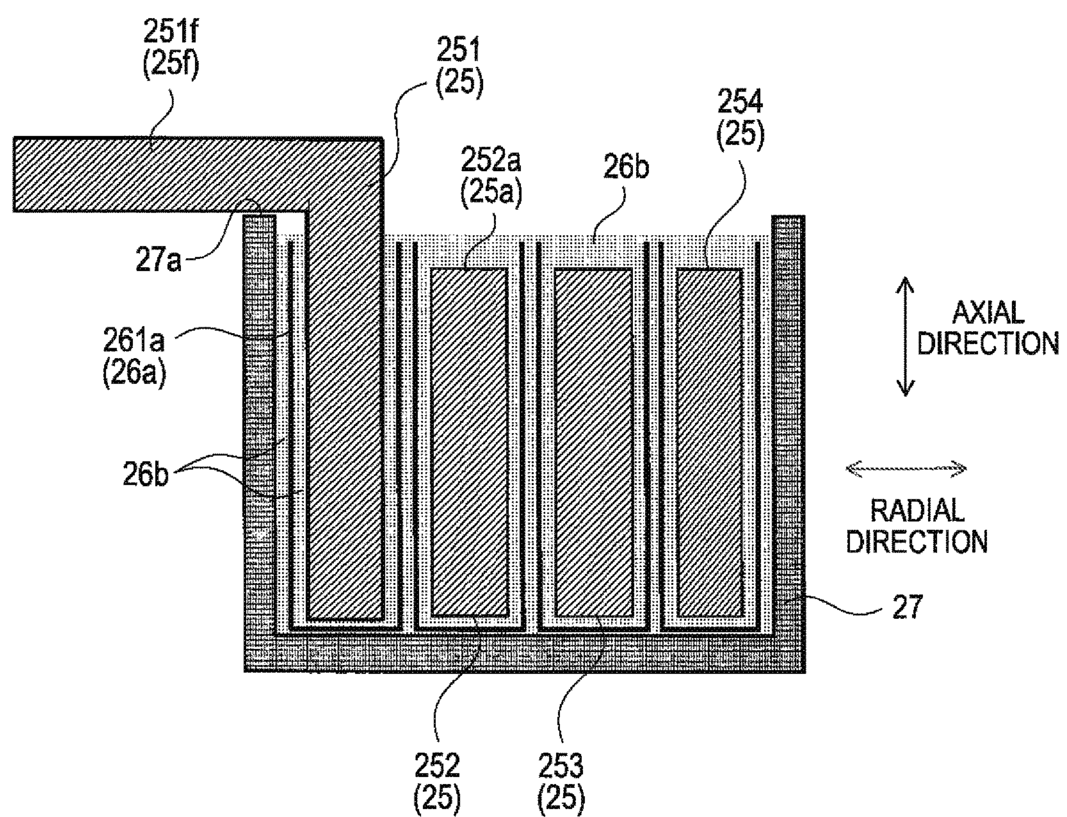
FIG. 8 is a cross section taken along the line I-I of FIG. 6.

The U-phase bus bar 251 has a feed portion (terminal portion) 251*e* connected to a power conversion circuit (not shown), such as an inverter, and feeding power to the U-phase stator coil 231 and a coil connection portion (terminal portion) 251*f* extending radially inward along an axial end face 27*a* (inner peripheral side) of the holder 27 and connected to one end of the U-phase stator coil 231 (see FIG. 6 through FIG. 8). The V-phase bus bar 252 has a feed portion 252*e* connected to the power conversion circuit and feeding power to the V-phase stator coil 232 and a coil connection portion 252*f* extending radially inward along an axial end face 251*a* of the U-phase bus bar 251 (bus bar different from the V-phase bus bar 252) and an axial end face 27*a* (inner peripheral side) of the holder 27 and connected to one end of the V-phase stator coil 232 (see FIG. 6 and FIG. 9). Further, the W-phase bus bar 253 has a feed portion 253*e* connected to the power conversion circuit and feeding power to the W-phase stator coil 233 and a coil connection portion 253*f* extending radially inward along axial end faces 252*a* and 251*a* of the V-phase bus bar 252 and the U-phase bus bar 251 (bus bars different from the W-phase bus bar 253), respectively, and the axial end face 27*a* (inner peripheral side) of the holder 27 and connected to one end of the W-phase stator coil 233 (see FIG. 6 and FIG. 10). The neutral point bus bar 254 has a coil connection portion 254*f* extending radially inward along the axial end faces 253*a* through 251*a* of the W-phase bus bar 253, the V-phase bus bar 252, and the U-phase bus bar 251 (bus bars different from the neutral point bus bars 254), respectively, and the axial end face 27*a* (inner peripheral side) of the holder 27 and connected to all the other ends of the stator coil 23 as a neutral point (see FIG. 6 and FIG. 11). The feed portions 251*e* through 253*e* and the coil connection portions 251*f* through 254*f* are connected by joining means, such as caulking and welding. Each of the coil connection portions 251*f* through 254*f* is shaped substantially like a capital L. For example, the coil connection portion 251*f* is provided so as to protrude in the axial direction from the axial end face 251*a* of the U-phase bus bar 251 and a tip end is bent radially inward. The same applies to the other coil connection portions 252*f* through 254*f* and a further description is omitted herein. The bus bar 25 is formed in an annular shape, for example, by being punched out from a conductive metal plate material by a pressing machine (not shown) followed by bending. Both radial side surfaces 25*b* and an axial end face 25*c* of the bus bar 25 are covered with a sheet-like insulation member 26*a* described below. For example, in a case where a radial length (thickness, T of FIG. 6) of the U-phase bus bar 251 is long for an inner diameter (r of FIG. 6) of the U-phase bus bar 251, an outer diameter (=r+T) of the U-phase bus bar 251 becomes long. Hence, when the U-phase bus bar 251 is formed in an annular shape, the U-phase bus bar 251 expands on the outer peripheral side and contracts on the inner peripheral side. Accordingly, when the U-phase bus bar 251 is covered with the sheet-like insulation member 26*a* described below, creases occur on the inner peripheral side of the sheet-like insulation member 261*a* (left side of the radial side surface 251*b* of FIG. 4) and insulation between bus bars 25 may possibly be deteriorated. In order to prevent this inconvenience, expansion of the bus bar 25 formed in an annular shape (found by subtracting 1 from a ratio of the outer diameter r+T to the inner diameter r), that is, T/r, is given, for example, as $T/r<0.02$ in the first embodiment. By reducing the radial length T of the bus bar 25 for the inner diameter r of the bus bar 25 in this manner, the occurrence of creases can be suppressed when the bus bar 25 is covered with the sheet-like insulation member 26*a*. The stator 20 can be therefore compact.

The insulation member 26 is to cover the both radial side surfaces 25*b* and the both axial end faces 25*a* and 25*c* (end face on the side of the holder 27) of each bus bar 25, and formed of the sheet-like insulation member 26*a* covering the both radial side surfaces 25*b* and the axial end face 25*c* of the bus bar 25 and a bonding member 26*b* not only covering the axial end face 25*a* of the bus bar 25 but also bonding one end portion of the sheet-like insulation member 26*a* to the other end portion. The bus bars 25 covered with the insulation member 26 are laminated in the radial direction on the outer peripheral side of the stator coil 23 and inserted into the holder 27 from an axial direction of the rotating electrical machine 100 and held therein. Hereinafter, the sheet-like insulation member 26*a* and the bonding member 26*b* forming the insulation member 26 will be described in detail.

The sheet-like insulation member 26*a* is a sheet of insulation member formed, for example, of aramid paper (thickness of about 0.3 mm). Herein, FIG. 3 shows a case where the sheet-like insulation member 26*a* is aramid paper and each bus bar 25 is covered with one sheet of aramid paper. The sheet-like insulation member 26*a* in this case is formed of four aramid paper sheets 261*a* through 264*a*. As is shown in FIG. 4, the aramid paper sheet 261*a* covering the U-phase bus bar 251 has a substantially U-shaped cross section taken along the line A-A of FIG. 2 and covers the both radial side surfaces 251*b* of the U-phase bus bar 251 and also covers the axial end face 251*c*. When the bus bar 251 is covered with the aramid paper sheet 261*a*, the bus bar 251 and the aramid paper sheet 261*a* are bonded to each other by filling a space therebetween with the bonding member 26*b* described below. The same applies to the other aramid paper sheets 262*a* through 264*a* and a description is omitted herein. In this manner, because the aramid paper sheets 261*a* through 264*a* cover the both radial side surfaces 251*b* through 254*b* of the bus bars 251 through 254, respectively, it becomes possible to secure insulation between the adjacent bus bars 25. The aramid paper sheet 261*a* of a single-layer structure has been described as an example of the sheet-like insulation member 26*a*. It should be appreciated, however, that the sheet-like insulation member 26*a* is not limited to the above example and may be other sheet-like insulation members. The sheet-like insulation member 26*a* can be insulation paper of a single-layer structure or insulation paper of a multi-layer structure other than aramid paper.

Figure 5:
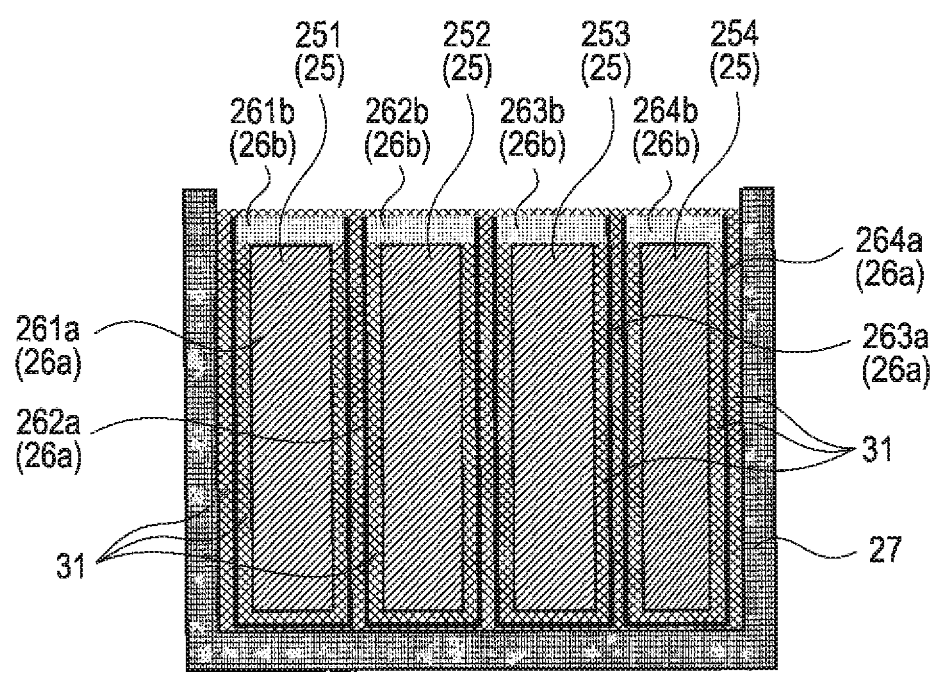
FIG. 5 is a cross section in the vicinity of the bus bars 251 through 254 in a case where a portion to be bonded by a bonding member **26*b* shown in FIG. 3 is bonded with an adhesive 31**.

The bonding member 26*b* is a bonding member having electrical insulation properties, for example, silicone rubber. When the both radial side surfaces 251*b* and the axial end face 251*c* of the U-phase bus bar 251 are covered with the aramid paper sheet 261*a*, silicone rubber 26*b* (bonding member 26*b*) is applied so as not only to cover the axial end face 251*a* of the U-phase bus bar 251 but also to bond both ends 261*a*1 of the aramid paper sheet 261*a* (bond one end to the other end). The same applies to the bus bars 252 through 254 covered with the other aramid paper sheets 262*a* through 264*a*, respectively, and a description is omitted herein. FIG. 3 shows a case where the axial end face 251*a* of the bus bar 251 is covered with the silicone rubber 26*b* having electrical insulation properties and also the bus bar 251 and the aramid paper sheet 261*a* are bonded to each other by filling a space therebetween with the silicone rubber 26*b*. It should be appreciated, however, that the invention is not limited to this case. It may be configured in such a manner as is shown in FIG. 5 that silicone rubber 261*b* (through 264*b*) is applied so as not only to cover the axial end face 251*a* (through 254*a*) of the bus bar 251 (through 254) but also to bond the both end portions 261*a*1 (through 264*a*1) of the aramid paper sheet 261*a* (through 264*a*), and the bus bar 251 (through 254) and the aramid paper sheet 261*a* (through 264*a*) are bonded to each other by filling a space therebetween with an adhesive 31 having no electrical insulation properties. The silicone rubber 26*b* has been described as an example of the bonding member 26*b*. It should be appreciated, however, that the bonding member 26*b* can be other bonding members having electrical insulation properties and the bonding member 26*b* can be insulation varnish or the like.

The holder 27 is formed, for example, of a resin member having electrical insulation properties and holds the bus bars 251 through 254 covered with the insulation members 261 through 264, respectively. As can be understood from FIG. 3, the holder 27 is attached to the bobbin 22 on an outer peripheral side and on one side of the stator core 21 in the axial direction. The holder 27 may be formed integrally with the bobbin 22. The holder 27 has, for example, a concave holding groove 27*b* in which to hold the bus bars 251 through 254. The holder 27 holds the bus bars 251 through 254 covered with the insulation members 261 through 264, respectively, which are in a radially laminated state and inserted into the holding groove 27*b* from the axial direction of the rotating electrical machine 100. Also, when the bus bars 251 through 254 covered with the aramid paper sheets 261*a* through 264*a*, respectively, are inserted into the holder 27 in the axial direction of the rotating electrical machine 100, the holder 27 and the aramid paper sheets 261*a* through 264*a* are bonded to each other by filling a space therebetween with the silicone rubber 26*b* (bonding member 26*b*). FIG. 3 shows a case where the holder 27 and the aramid paper sheets 261*a* through 264*a* are bonded to each other by filling a space therebetween with the silicone rubber 26*b* having electrical insulation properties. It should be appreciated, however, that the invention is not limited to this case. It may be configured in such a manner as is shown in FIG. 5 that the holder 27 and the aramid paper sheets 261*a* through 264*a* are bonded to each other by filling a space therebetween with the adhesive 31 having no electrical insulation properties. FIG. 5 shows a case where a space between the bus bar 251 (through 254) and the aramid paper sheets 261*a* (through 264*a*) is filled with the adhesive 31 and further a space between the holder 27 and the aramid paper sheets 261*a* through 264*a* is also filled with the adhesive 31, so that the respective components are boned to each other. It goes without saying, however, that the holder 27 and the aramid paper sheets 261*a* through 264*a* may be bonded to each other by filling a space therebetween with the silicone rubber 26*b*.

As has been described, the stator 20 according to the first embodiment of the invention is formed in an annular shape and includes multiple bus bars 25 (251 through 254) laminated in the radial direction, and the insulation member 26 (261 through 264) covering the both radial side surfaces 25*b* (251*b* through 254*b*) and the both axial end faces 25*a* (251*a* through 254*a*) and 25*c* (251*c* through 254*c*) of each bus bar 25. The insulation member 26 contains the sheet-like insulation member 26*a* (261*a* through 264*a*) covering the both radial side surfaces 25*b* and the axial end face 25*c* (at least one of the axial end faces 25*a* and 25*c*) of each bus bar 25. Accordingly, of the bus bars 25 laminated in the radial direction, every bus bar 25 is insulated from the adjacent one by the sheet-like insulation member 26*a* covering the both radial side surfaces 25*b* of each bus bar 25. It thus becomes possible to secure insulation between the bus bars 25 without having to separately provide a space with the purpose of securing the creeping distance between the bus bars 25. Accordingly, a radial width between the bus bars can be narrowed by a quantity comparable to the space separately provided in the related art. It thus becomes possible to provide the stator 20 that can be more compact while maintaining insulation reliability between the bus bars 25 and the rotating electrical machine 100 equipped with the stator 20.

In a case where the axial end face of the bus bar is exposed to the outside, there may be influences of fouling caused by intrusion of foreign matter from the outside. In the first embodiment, however, the respective bus bars 25 are not exposed to the outside because the both axial end faces 25*a* and 25*c* are covered with the insulation member 26 in addition to the both radial side surfaces 25*b*, and are therefore unsusceptible to intrusion of foreign matter. More specifically, oil, such as ATF (Automatic Transmission Fluid), contains metal powder produced by wearing of gears or the like. Under this oil atmosphere, the metal powder is likely to adhere to the rotating electrical machine. In the rotating electrical machine 100 of the first embodiment, however, the insulation member 26 covering the both radial side surfaces 25*b* and the both axial end faces 25*a* and 25*c* of the bus bar 25 prevents adhesion of the metal powder on the bus bar 25. It thus becomes possible to secure insulation between the bus bars 25 in a reliable manner.

The above has disclosed the structure by which bus bars are inserted into the holding groove provided to the holder and insulation resin is inserted as secondary insulation in order to prevent intrusion of foreign matter from the outside, so that insulation between the bus bars is secured. In this case, a molding pressure during the insert molding is so high that the bus bars are not held in the holding groove due to the molding pressure during the molding and poor insulation occurs between the bus bars. Accordingly, there is a problem that it is difficult to secure insulation by insert molding. In order to overcome this problem, the first embodiment of the invention is configured in such a manner that the insulation member 26 is formed of the sheet-like insulation member 26*a* (261*a* through 264*a*) and the bonding member 26*b* (261*b* through 264*b*) having insulation properties. The sheet-like insulation member 26*a* covers the both radial side surfaces 25*b* and the axial end face 25*c* (one of the axial end faces 25*a* and 25*c*) of each bus bar 25, and the bonding member 26*b* not only covers the axial end face 25*a* (the other one of the axial end faces 25*a* and 25*c*) but also bonds one end portion of the sheet-like insulation member 26*a* to the other end portion (bond both end portions 261*a*1 of the aramid paper sheet 261*a*). Hence, not only by covering the both radial side surfaces 25*b* and the axial end face 25*c* of each bus bar 25 by the sheet-like insulation member 26*a* but also by applying the bonding member 26*b* to the axial end face 25*a* of each bus bar 25, it becomes possible to prevent intrusion of foreign matter from the outside while securing insulation between the bus bars without a pressure being applied to the bus bars. Hence, insulation between the bus bars can be secured and intrusion of foreign matter from the outside can be prevented at the same time without the need of insert molding.

Figure 9:
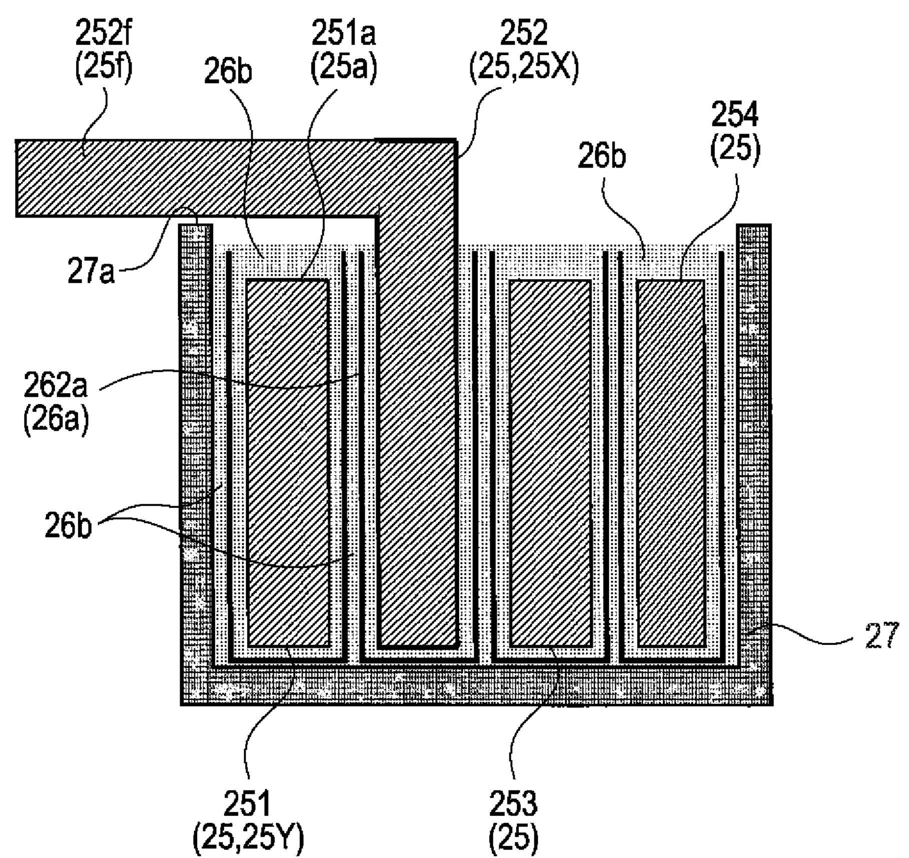
FIG. 9 is a cross section taken along the line II-II of FIG. 6.
Figure 10:
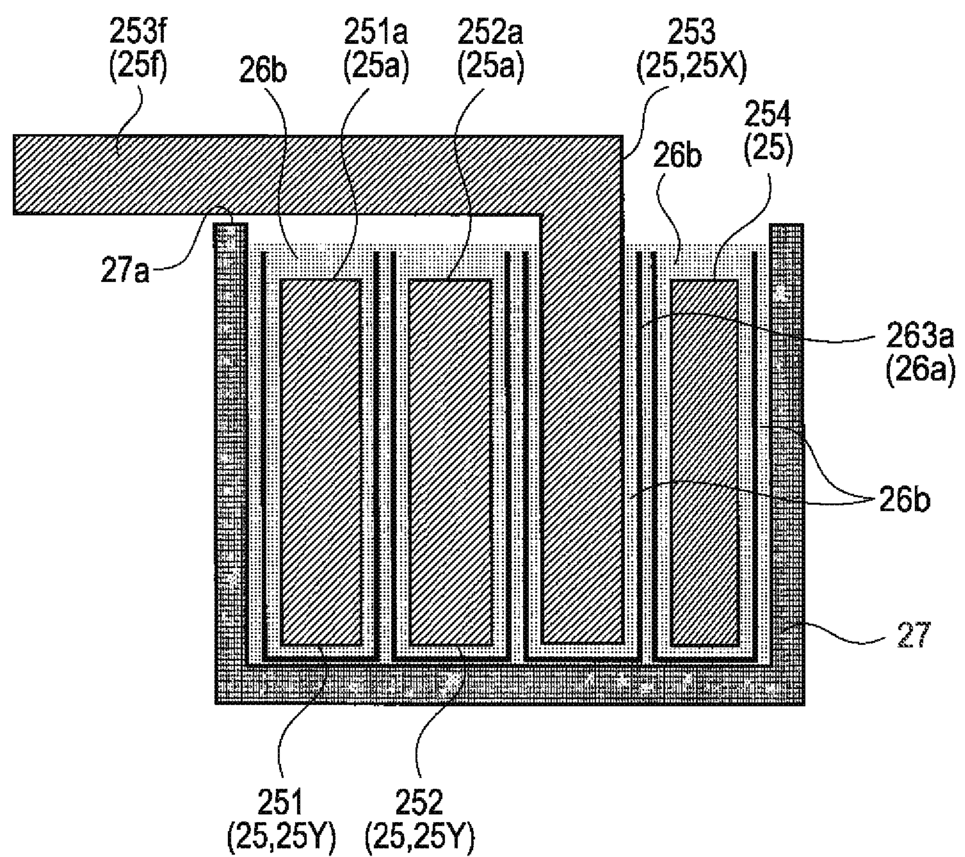
FIG. 10 is a cross section taken along the line III-III of FIG. 6.
Figure 11:
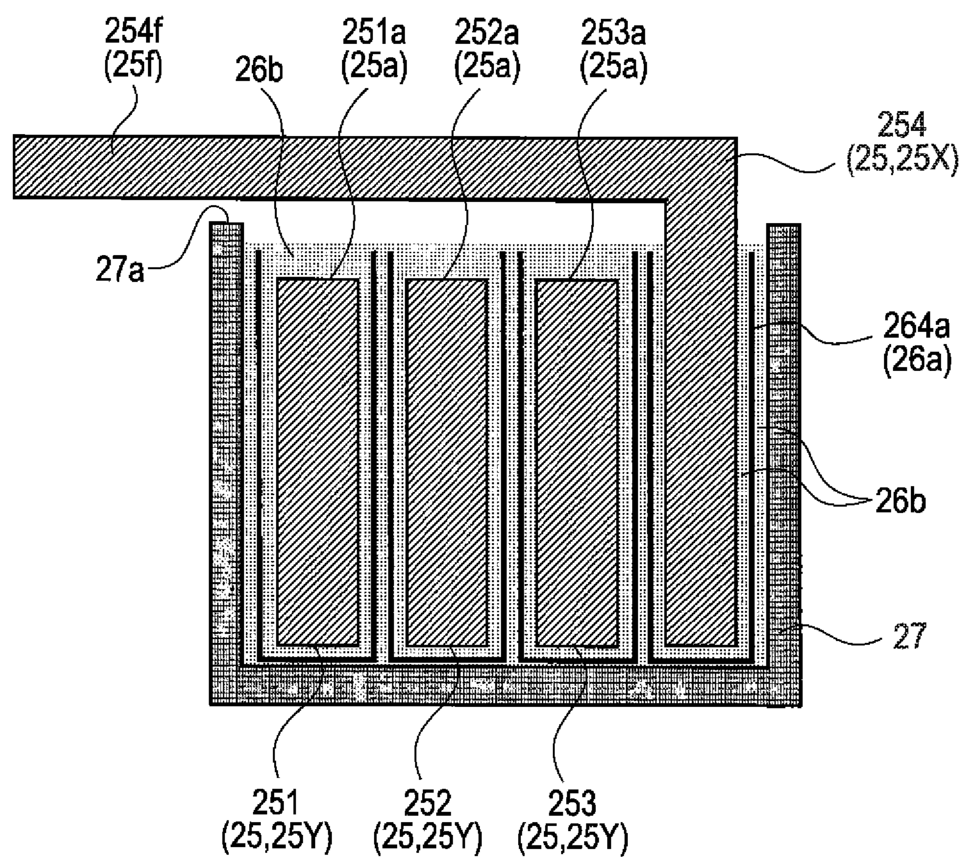
FIG. 11 is a cross section taken along the line IV-IV of FIG. 6.

According to the first embodiment of the invention, the axially protruding coil connection portions 251*f* through 253*f* (terminal portion 25*f*) are provided, respectively, to the axial end faces 251*a* through 253*a* of the U-phase bus bar 251 through the W-phase bus bar 253, respectively. Of these coil connection portions, for example, the coil connection portion 252*f* of the V-phase bus bar 252 extends, as is shown in FIG. 9, radially inward along the axial end face 251*a* of the U-phase bus bar 251 (bus bar different from the V-phase bus bar 252) and includes the bonding member 26*b* (insulation member) covering a space between the coil connection portion 252*f* (terminal portion 25*f*) and the axial end face 251*a* of the U-phase bus bar 251. Hence, the coil connection portion 252*f* (terminal portion 25*f*) of the V-phase bus bar 252 (bus bar 25) is electrically isolated from the axial end face 251*a* of the U-phase bus bar 251 (bus bar different from the bus bar 25 mentioned above) by the bonding member 26*b* having electrical isolation properties. It thus becomes possible to secure insulation between the bus bars 25 without having to separately provide a space with the purpose of securing the creeping distance between the bus bars 25. Accordingly, it becomes possible to lower an axial height between the axial end face 251*a* of the U-phase bus bar 251 and the terminal portion 25*f* (coil connection portion 252*f*) of the V-phase bus bar 252 in a portion opposed across the axial end face 251*a*, which is comparable to the space provided separately in the related art. It thus becomes possible to provide the stator 20 that can be more compact while maintaining insulation reliability between the bus bars 25 and the rotating electrical machine 100 equipped with the stator 20. The same advantage can be obtained with the other terminal portions 25*f* including the coil connection portions 251*f*, 253*f*, and 254*f*. More specifically, the axially protruding terminal portion 25*f* (corresponding, for example, to the coil connection portion 252*f* of FIG. 9) is provided to the axial end face 25*a* (for example, 252*a* of FIG. 9) of the bus bar 25 (first bus bar, corresponding, for example, to the V-phase bus bar 252 of FIG. 9, and referred to hereinafter as the bus bar 25X). The bonding member 26*b* (insulation member) covering the axial end face 25*a* (for example, 251*a* of FIG. 9) of the bus bar 25 (second bus bar, corresponding, for example, to the U-phase bus bar 251 of FIG. 9 and referred to hereinafter as the bus bar 25Y) different from the bus bar 25X electrically isolates the terminal portion 25*f* of the bus bar 25X in a portion opposed across the axial end face 25*a* of the bus bar 25Y from the axial end face 25*a* of the bus bar 25Y. It thus becomes possible to secure insulation between the bus bars 25 without having to separately provide an insulation member to electrically isolate one bus bar from the other bus bar. In the first embodiment, by bonding the terminal portion 25*f* (coil connection portion) of the bus bar 25X and the axial end face 25*a* of the bus bar 25Y so as to cover a space therebetween by filling the space with the bonding member 25*b*, the terminal portion 25*f* can be fixed in a more reliable manner.

The first embodiment has described a case where the stator coil 23 is located on the inner peripheral side of the bus bar 25 and the coil connection portion 25*f* (terminal portion 25*f*) extends radially inward and is connected to one end of the stator coil 23 of the corresponding phase. It should be appreciated, however, that the stator coil 23 may be located on the outer peripheral side of the bus bar 25. In this case, for example, the coil connection portion 252*g* (terminal portion 25*g*) of the V-phase bus bar 252 extends radially outward along the axial end face 253*a* of the W-phase bus bar 253 (bus bar different from the V-phase bus bar 252) and the axial end face 27*a* (outer peripheral side) of the holder 27 and is connected to one end of the V-phase stator coil 232. Also, as with the coil connection portion 25*f*, it may be configured in such a manner that the feed portion 25*e* protruding in the axial direction from the axial end face 25*a* of each bus bar 25 extends radially inward or radially outward and is connected to the power conversion circuit.

Figure 12:
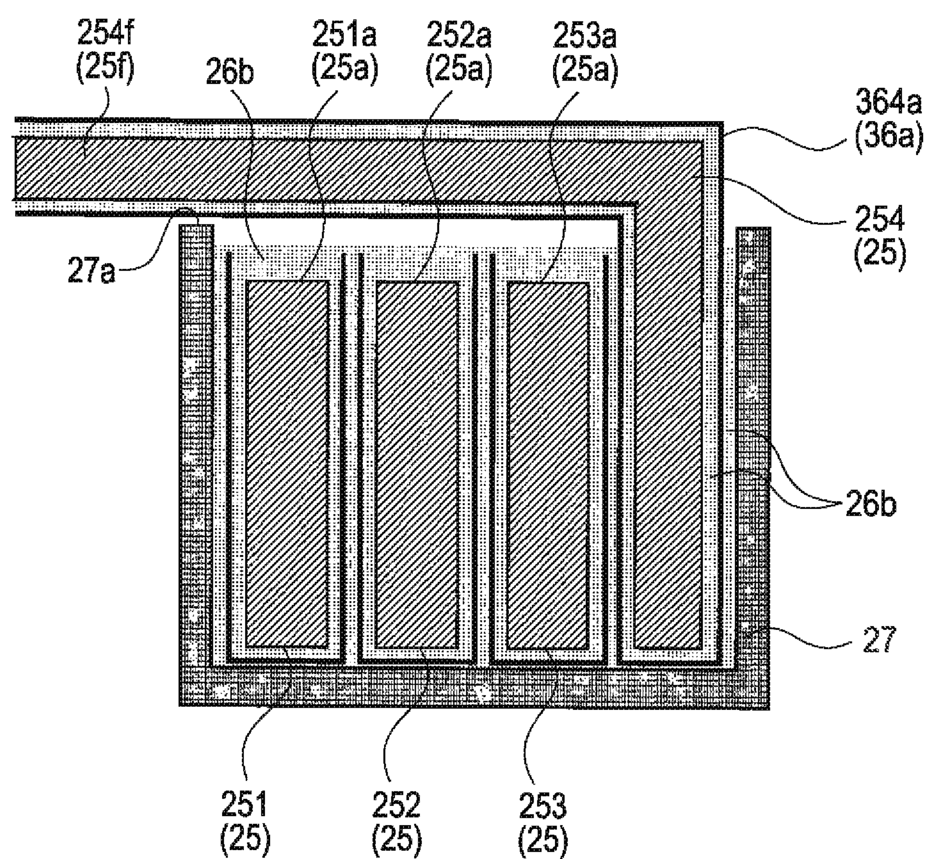
FIG. 12 is a cross section of a sheet-like insulation member **364*a* (36*a*) as a modification of a sheet-like insulation member 264*a* (26*a*) shown in FIG. 11**.

Further, the first embodiment has described a case where a space between the terminal portion 25*f* of the bus bar 25X and the axial end face 25*a* of the second bus bar 25Y is covered by the bonding member 26*b* covering the axial end face 25*a* of the bus bar 25Y. It should be appreciated, however, that the invention is not limited to this case. Of the bus bars 25, for example, the neutral point bus bar 254 may be configured in such a manner as is shown in FIG. 12 that not only the both radial side surfaces 254*b* and the axial end face 254*c* of the neutral point bus bar 254, but also the coil connection portion 254*f* (terminal portion 25*f*) is covered with an aramid paper sheet 364*a* (sheet-like insulation member 36*a*). By covering the terminal portion 254*f* of the neutral point bus bar 254 at least in a portion opposed across the axial end faces 253*a* through 251*a* of the bus bars (W-phase bus bar 253, V-phase bus bar 252, and U-phase bus bar 251, respectively) different from the neutral point bus bar 254 with the aramid paper sheet 364*a*, it becomes possible to provide the stator 20 that can be more compact while maintaining insulation reliability between the bus bars 25 and the rotating electrical machine 100 equipped with the stator 20. The same advantage can be obtained with the other terminal portions 25*f* including the coil connection portions 251*f* through 253*f*. Alternatively, it may be configured in such a manner that an insulation member 32, which is different from the bonding member 26*b* and the sheet-like insulation member 26*a* described above, is provided separately as a member covering a space between the terminal portion 25*f* of the bus bar 25X in a portion opposed across the axial end face 25*a* of the bus bar 25Y and the axial end face 25*a* of the bus bar 25Y, and the space therebetween is covered by the insulation member 32.

According to the stator 20 of the first embodiment of the invention, the bus bar 25 and the sheet-like insulation member 26*a* are bonded to each other by the bonding member 26*b*. Hence, the bus bar 25 and the sheet-like insulation member 26*a* can be brought into close contact with each other. It thus becomes possible to provide the stator 20 with further enhanced insulation reliability between the bus bars 25 and the rotating electrical machine 100 equipped with the stator 20.

Further, the stator 20 of the first embodiment of the invention includes the holder 27 holding the bus bars 25 and the sheet-like insulation member 26*a* covering the both radial side surfaces 25*b* and the axial end face 25*c* of each bus bar 25 is bonded to the holder 27 by the bonding member 26*b*. Hence, not only can the bus bars 25 be fixed within the holder 27 in a more reliable manner, but also the positions of the respective bus bars 25 can be fixed. It thus becomes possible to provide the stator 20 with further enhanced insulation reliability between the bus bars 25 and the rotating electrical machine 100 equipped with the stator 20.

Figure 13:
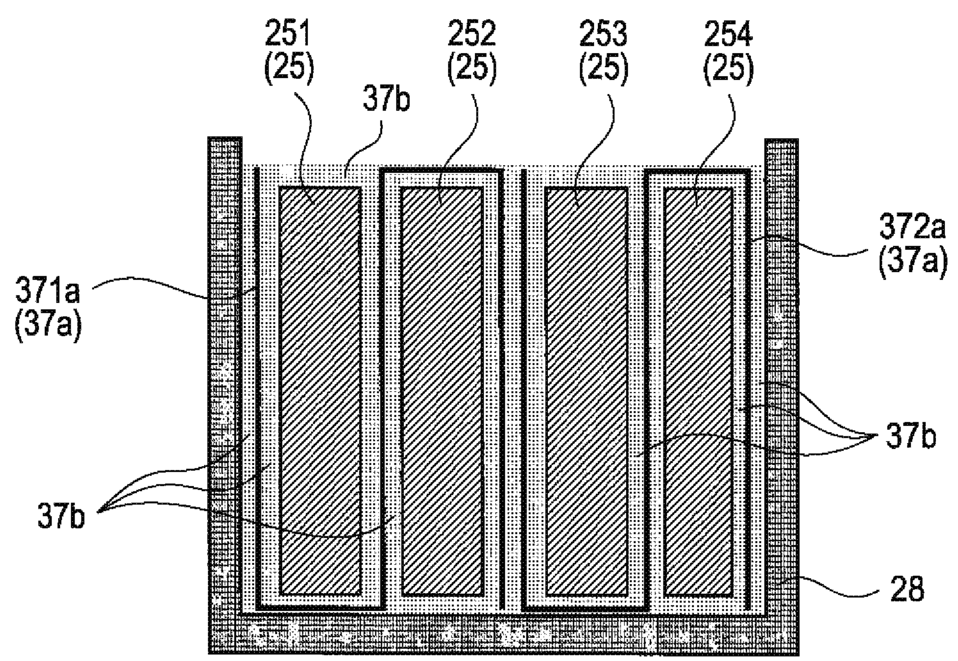
FIG. 13 is a cross section of a sheet-like insulation member 37*a* as a modification of a sheet-like insulation member 26*a* shown in FIG. 3.
Figure 14:
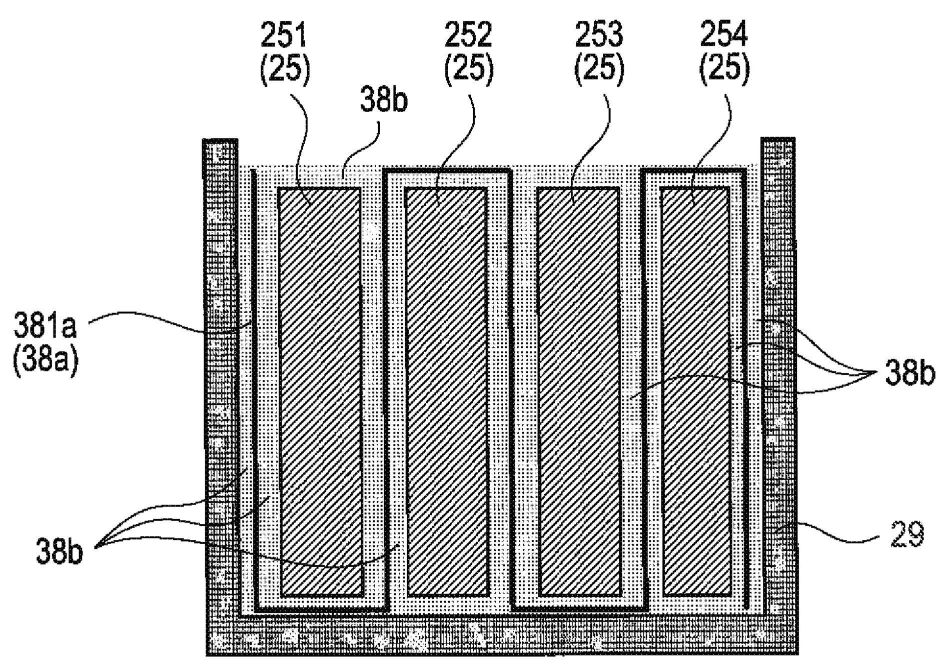
FIG. 14 is a cross section of a sheet-like insulation member 38*a* as another modification of the sheet-like insulation member 26*a* shown in FIG. 3.

Furthermore, the first embodiment has described a case where the sheet-like insulation member 26*a* covering the both radial side surfaces 25*b* and the axial end face 25*c* of the bus bar 25 is formed of the four aramid paper sheets 261*a* through 264*a* as is shown in FIG. 3, and the bus bars 251 through 254 are covered with the aramid paper sheets 261*a* through 254, respectively, in a one-to-one correspondence. It should be appreciated, however, that the invention is not limited to this case. For example, it may be configured in such a manner as is shown in FIG. 13 that an insulation member 37 is formed of a sheet-like insulation member 37*a* and a bonding member 37*b* having electrical insulation properties and the sheet-like insulation member 37*a* is formed of two aramid paper sheets 371*a* and 372*a*, so that the U-phase bus bar 251 and the V-phase bus bar 252 are covered with one aramid paper sheet 371*a* and the W-phase bus bar 253 and the neutral point bus bar 254 are covered with one aramid paper sheet 372*a*. Alternatively, it may be configured in such a manner as is shown in FIG. 14 that an insulation member 38 is formed of a sheet-like insulation member 38*a* and a bonding member 38*b* having electric insulation properties and the sheet-like insulation member 38*a* is formed of a single aramid paper sheet 381*a*, so that the bus bars 251 through 254 are covered with the single aramid paper sheet 381*a*. In the case shown in FIG. 13, the aramid paper sheet 371*a* not only covers the axial end face 251*c* of the U-phase bus bar 251 and the axial end face 252*a* of the V-phase bus bar 252, but also continuously covers a radial side surface between the U-phase bus bar 251 and the V-phase bus bar 252 (space between adjacent bus bars) while covering the radial side surfaces 251*b* and 252*b* of the U-phase bus bar 251 and the V-phase bus bar 252, respectively. Also, the aramid paper sheet 372*a* not only covers the axial end face 253*c* of the W-phase bus bar 253 and the axial end face 254*a* of the neutral point bus bar 254, but also continuously covers a radial side surface between the W-phase bus bar 253 and the neutral point bus bar 254 (space between adjacent bus bars) while covering the both radial side surfaces 253*b* and 254*b* of the W-phase bus bar 253 and the neutral point bus bar 254, respectively. Hence, in comparison with a case where the sheet-like insulation member 26*a* is formed of the four aramid paper sheets 261*a* through 264*a*, the cost is reduced because the number of components is reduced. Moreover, because the radial side surfaces between the adjacent bus bars (between the bus bars 251 and 252 and between the bus bars 253 and 254) are continuously covered with the respective aramid paper sheets 371*a* and 372*a*, movements of the respective bus bars 251 through 254 in the axial direction are restricted in the event of vibrations. It thus becomes possible to provide the stator 20 with enhanced vibration resistance and the rotating electrical machine 100 equipped with the stator 20. In the case of FIG. 14, the vibration resistance can be enhanced as with the case of FIG. 13. Moreover, because the sheet-like insulation member 38*a* is formed of the single aramid paper sheet 381*a*, the number of components can be reduced further than in the case of FIG. 13. Hence, the cost can be reduced further.

Second Embodiment

Figure 15:
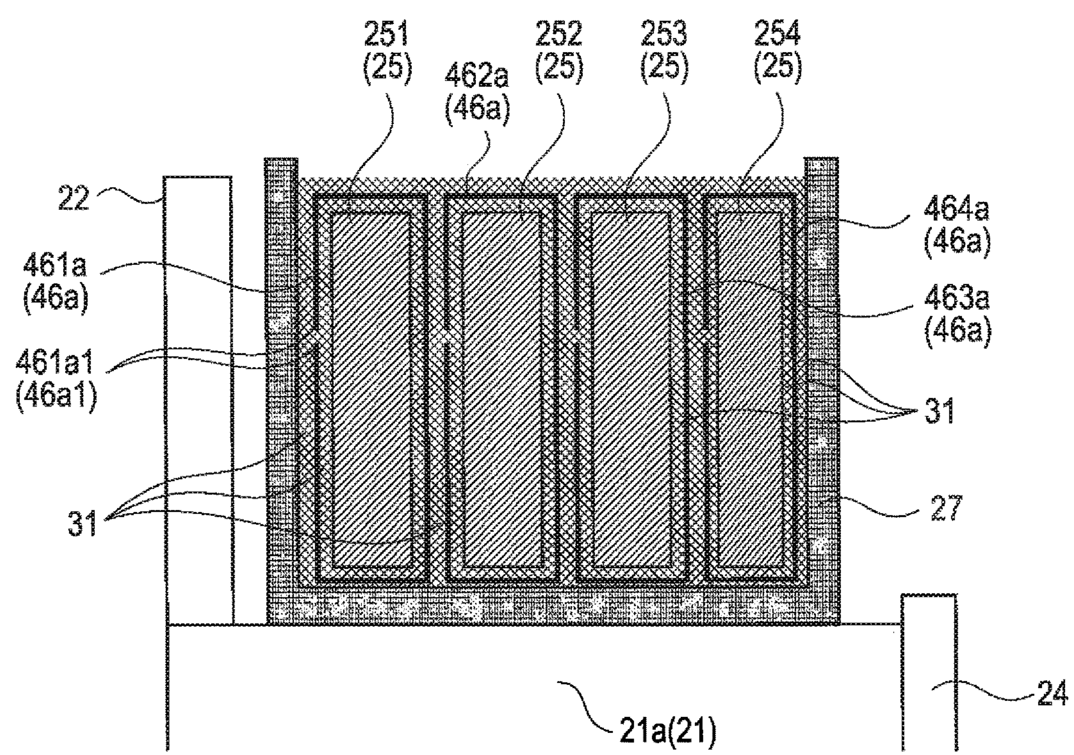
FIG. 15 is a cross section of an insulation member 46 (sheet-like insulation member 46*a*) forming a stator 40 of a rotating electrical machine 200 according to a second embodiment of the invention.

Hereinafter, a rotating electrical machine 200 equipped with a stator 40 of a second embodiment will be described according to FIG. 15 through FIG. 21. FIG. 15 is a cross section of an insulation member 46 forming the stator 40 of the rotating electrical machine 200 according to the second embodiment of the invention. As is shown in FIG. 15, the rotating electrical machine 200 equipped with the stator 40 of the second embodiment has the insulation member 46 covering the bus bars 25, which is, however, configured differently from the insulation member 26 described in the first embodiment above. The rest of the configuration is the same as that of the rotating electrical machine 100 of the first embodiment above and a detailed description is omitted herein. Of reference numerals used in FIG. 15 and so on, reference numerals same as those used in the above description denote the same portions.

Figure 16:
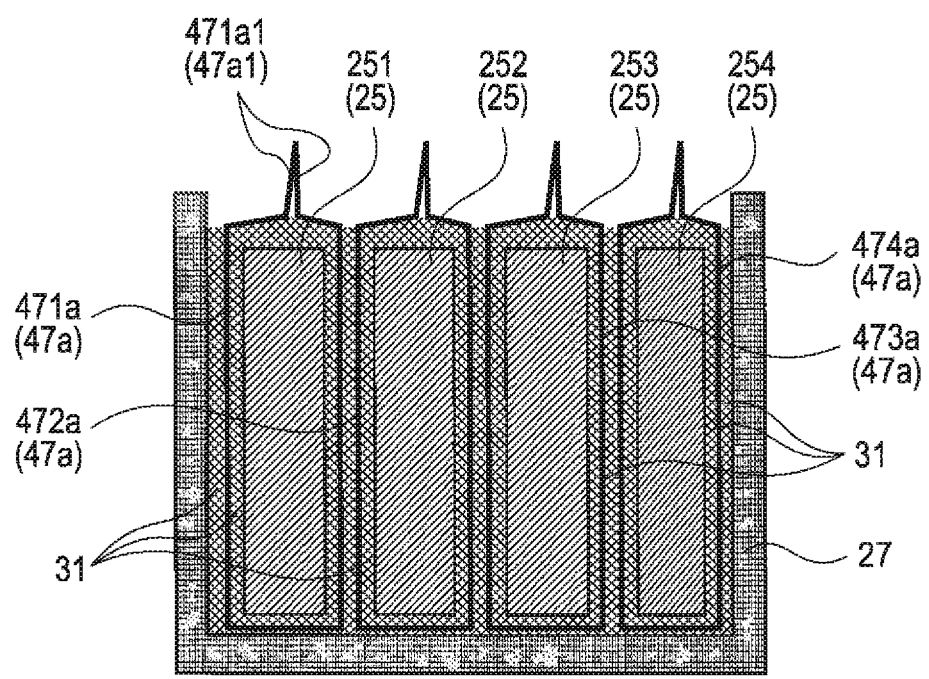
FIG. 16 is a cross section of a sheet-like insulation member 47*a* as a modification of the sheet-like insulation member 46*a* shown in FIG. 15.

As is shown in FIG. 15, the bus bar 25 is formed of four bus bars 251 through 254 and the insulation member 46 is formed of a sheet-like insulation member 46*a* covering the both radial side surfaces 25*b* and the both axial end faces 25*a* and 25*c* of each bus bar 25. The sheet-like insulation member 46*a* is a sheet of insulation member formed, for example, of aramid paper, as with the sheet-like insulation member 26*a* described above. FIG. 15 shows a case where the sheet-like insulation member 46*a* is formed of four aramid paper sheets 461*a* through 464*a* and one bus bar 25 is covered with one aramid paper sheet. The aramid paper sheet 461*a* covering the U-phase bus bar 251 is shaped substantially like a capital C and covers the both radial side surfaces 251*b* and the both axial end faces 251*a* and 251*c* of the U-phase bus bar 251. The aramid paper sheet 461*a* is installed so that both end portions 461*a*1 oppose alongside the radial side surface 251*b* (inner peripheral side in the drawing) of the U-phase bus bar 251. FIG. 15 shows a case where the aramid paper sheet 461*a* is installed so that the both end portions 461*a*1 oppose alongside the radial side surface 251*b* of the U-phase bus bar 251 on the inner peripheral side. It should be appreciated, however, that the aramid paper sheet 461*a* may be installed so that the both end portions 461*a*1 oppose alongside the outer peripheral side. Alternatively, it may be configured in such a manner as is shown in FIG. 16 that both end portions 471*a*1 of an aramid paper sheet 471*a* do not oppose alongside the radial side surface 251*b* of the U-phase bus bar 251 and instead both end portions 47*a*1 of an aramid paper sheet 47*a* covering each bus bar 25 are press-fit or press-bonded to each other (one end portion is press-fit or press-bonded to the other end portion), for example, in the vicinity of the axial end face 25*a*. Because the aramid paper sheets 461*a* through 464*a* cover the both radial side surfaces 251*b* through 254*b* of the bus bars 251 through 254, respectively, in this manner, it becomes possible to secure insulation between the adjacent bus bars 25.

Figure 17:
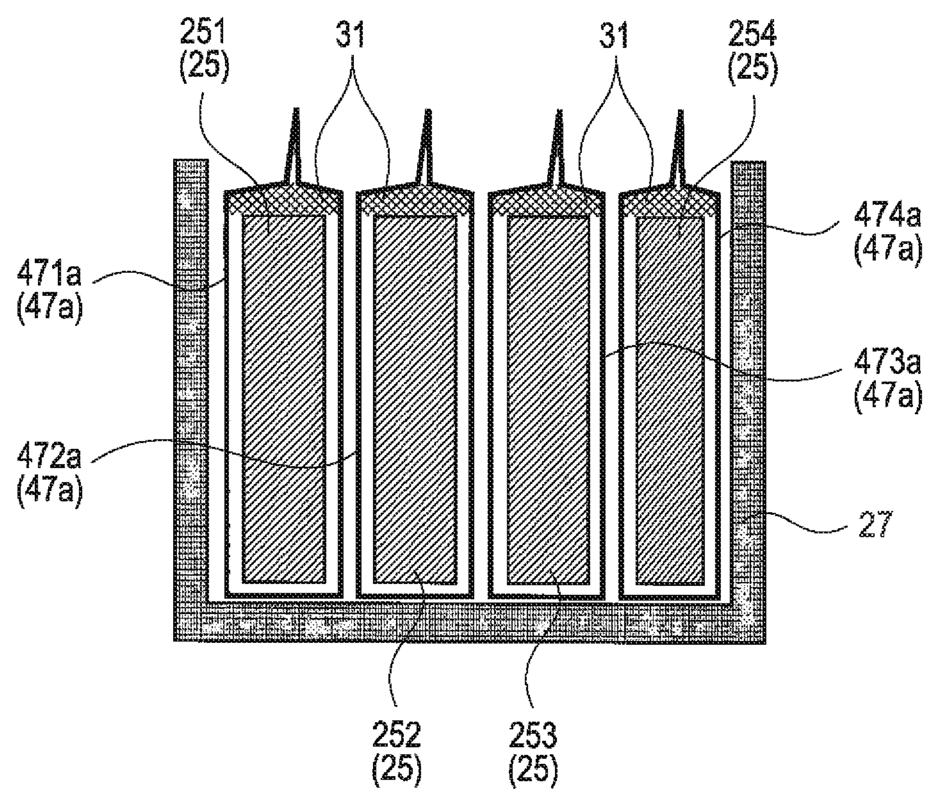
FIG. 17 is a cross section in the vicinity of bus bars 251 through 254 in a case where a portion bonded by an adhesive 31 shown in FIG. 16 is changed.

When the bus bar 251 is covered with the aramid paper sheet 461*a*, the bus bar 251 and the aramid paper sheet 461*a* are bonded to each other by filling a space therebetween with an adhesive 31. The same applies to the other aramid paper sheets 462*a* through 464*a* and a description is omitted herein. Also, when the bus bars 251 through 254 covered with the aramid paper sheets 461*a* through 464*a*, respectively, are inserted into the holder 27 in the axial direction of the rotating electrical machine 100, the holder 27 and the aramid paper sheets 461*a* through 464*a* are bonded to each other by filling a space therebetween with the adhesive 31. FIG. 16 shows a case where the space between each bus bar 25 and the aramid paper sheet 47*a* is fully filled with the adhesive 31. It should be appreciated, however, that the invention is not limited to this case. In a case as is shown in FIG. 17 where the insulation member 47 is a sheet-like insulation member 47*a* formed of four aramid paper sheets 471*a* through 474*a* and both end portions 47*a*1 (471*a*1 through 474*a*1) of the sheet-like insulation member 47*a* (aramid paper sheets 471*a* through 474*a*) are press-fit or press-bonded to each other, for example, in the vicinity of the axial end face 25*a* of the bus bar 25, each bus bar 25 may be bonded to the sheet insulation member 47*a* by applying the adhesive 31 at least onto the axial end face 25*a* of the bus bar 25 in a space between each bus bar 25 and the sheet-like insulation member 47*a* (aramid paper sheets 471*a* through 474*a*).

Figure 18:
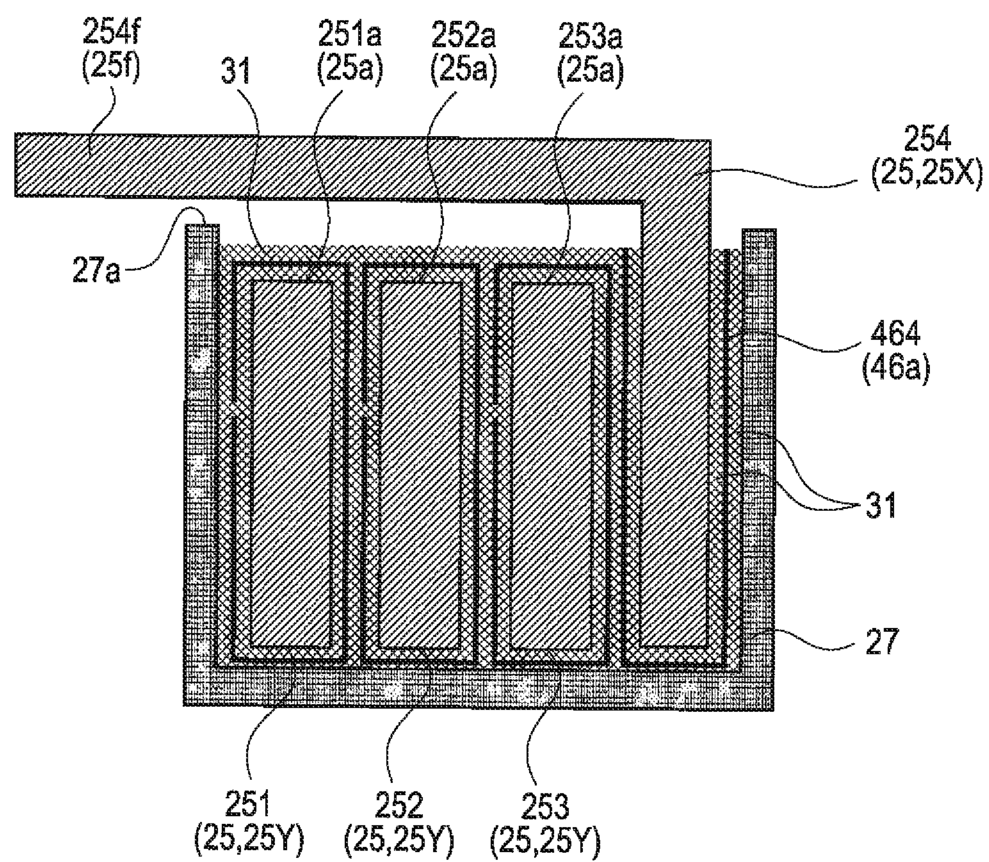
FIG. 18 is a cross section of a coil connection portion 251*f* of a U-phase bus bar 251 forming the stator 40 of the rotating electrical machine 200 according to the second embodiment of the invention.

Also, as in the first embodiment above, the terminal portions 25*e* and 25*f* protruding in the axial direction are provided to the axial end face 25*a* of the bus bar 25. The shapes and the like of the terminal portions 25*e* and 25*f* are the same as those in the first embodiment above. However, because the insulation member 46 is formed differently from the insulation member 26 of the first embodiment above, a detailed description will now be given to the coil connection portion 254*f* of the neutral point bus bar 254 as one representing the terminal portions 25*e* and 25*f* with reference to FIG. 18. FIG. 18 is a cross section in the vicinity of the coil connection portion 254*f* of the neutral point bus bar 254. The coil connection portion 254*f* of the neutral point bus bar 254 extends radially inward along the axial end faces 253*a* through 251*a* of the W-phase bus bar 253, the V-phase bus bar 252, and the U-phase bus bar 251 (bus bars different from the neutral point bus bar 254), respectively, and the axial end face 27*a* (inner peripheral side) of the holder 27 and is connected to one end of the U-phase stator coil 231.

As has been described above, the stator 40 according to the second embodiment of the invention is formed in an annular shape and includes multiple bus bars 25 (251 through 254) laminated in the radial direction and the insulation member 46 (461 through 464) covering the both radial side surfaces 25*b* (251*b* through 254*b*) and the both axial end faces 25*a* (251*a* through 254*a*) and 25*c* (251*c* through 254*c*) of each bus bar 25. The insulation member 46 contains the sheet-like insulation member 46*a* covering the both radial side surfaces 25*b* and the both axial end faces 25*a* and 25*c* of each bus bar 25. Accordingly, of the bus bars 25 laminated in the radial direction, every bus bar 25 is insulated from the adjacent one by the sheet-like insulation member 46*a* covering the both radial side surfaces 25*b* of each bus bar 25. It thus becomes possible to secure insulation between the bus bars 25 without having to separately provide a space with the purpose of securing the creeping distance between the bus bars 25. Accordingly, a radial width between the bus bars can be narrowed by a quantity comparable to the space separately provided in the related art. It thus becomes possible to provide the stator 40 that can be more compact while maintaining insulation reliability between the bus bars 25 and the rotating electrical machine 200 equipped with the stator 40.

In a case where the axial end face of the bus bar is exposed to the outside, there may be influences of fouling caused by intrusion of foreign matter from the outside. In the second embodiment, however, as in the first embodiment above, the axial end faces 25*a* and 25*c* of each bus bar 25 are not exposed to the outside and are therefore unsusceptible to intrusion of foreign matter.

Also, according to the second embodiment, the sheet-like insulation member 46*a* (aramid paper sheets 461*a* through 464*a*) covering each bus bar 25 (251 through 254) is installed so that the both end portions 46*a*1 (461*a*1 through 464*a*1) oppose alongside the radial side surface 25*b* of each bus bar 25. Hence, each bus bar 25 covered with the sheet-like insulation member 46*a* can be compact in the axial direction. It thus becomes possible to provide the stator 40 that can be compact in the axial direction and the rotating electrical machine 200 equipped with the stator 40.

Figure 19:
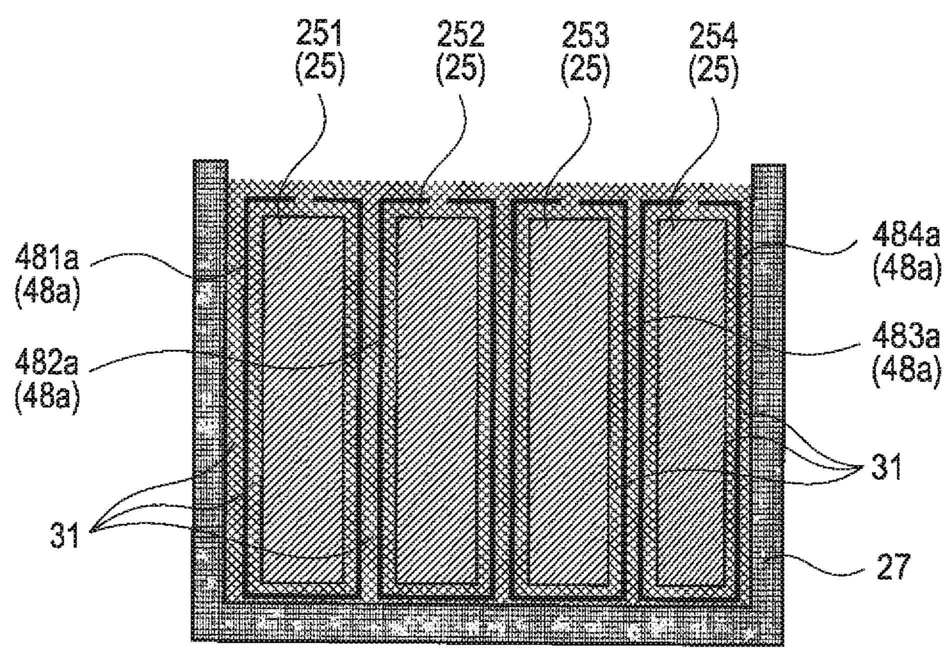
FIG. 19 is a cross section of a sheet-like insulation member 48*a* as a modification of the sheet-like insulation member 46*a* shown in FIG. 15.

The second embodiment has described a case where the sheet-like insulation member 46*a* is installed so that the both end portions 46*a*1 oppose alongside the radial side surface 25*b* of each bus bar 25. This configuration, however, may be modified in such a manner as is shown in FIG. 19 that an insulation member 48 is a sheet-like insulation member 48*a* formed of four aramid paper sheets 481*a* through 484*a* and the sheet-like insulation member 48*a* (aramid paper sheets 481*a* through 484*a*) is installed so that both end portions 48*a*1 (481*a*1 through 484*a*1) oppose alongside the axial end surface 25*a* of each bus bar 25. In this case, each bus bar 25 covered with the sheet-like insulation member 48*a* can be more compact in the radial direction. It thus becomes possible to provide the stator 40 that can be compact in the radial direction and the rotating electrical machine 200 equipped with the stator 40.

Also, according to the second embodiment of the invention, as in the first embodiment above, the coil connection portions 251*f* through 253*f* (terminal portions 25*f*) protruding in the axial direction are provided to the axial end faces 251*a* through 253*a* of the U-phase bus bar 251 through W-phase bus bar 253, respectively. Of these coil connection portions, for example, the coil connection portion 254*f* of the neutral point bus bar 254 extends, as is shown in FIG. 18, radially inward along the axial end faces 253*a* through 251*a* of the W-phase bus bar 253, the V-phase bus bar 252, and the U-phase bus bar 251 (bus bars different from the neutral bus bar 254), respectively, and includes the sheet-like insulation member 46*a* (aramid paper sheets 463*a* through 461*a*) covering spaces between the coil connection portions 254*f* (terminal portions 25*f*) and the axial end faces 253*a* through 251*a* of the W-phase bus bar 253 through the U-phase bus bar 251, respectively. Hence, the coil connection portion 254*f* of the neutral point bus bar 254 is electrically isolated from the axial end faces 253*a* through 251*a* of the W-phase bus bar 253 through the U-phase bus bar 251, respectively, by the aramid paper sheets 463*a* through 461*a*, respectively. It thus becomes possible to secure insulation between the adjacent bus bars 25 without having to separately provide a space with the purpose of securing the creeping distance between adjacent bus bars 25. Accordingly, it becomes possible to lower an axial height between the axial end faces 253*a* through 251*a* of the W-phase bus bar 253 through the U-phase bus bar 251, respectively, and the terminal portion 25*f* (coil connection portion 254*f*) of the neutral point bus bar 254 in a portion opposed across the axial end faces 253*a* through 251*a* of the bus bars (W-phase bus bar 253 through the U-phase bus bar 251, respectively) different from the neutral point bus bar 254, which is comparable to the space separately provided in the related art. It thus becomes possible to provide the stator 40 that can be more compact while maintain insulation reliability between adjacent bus bars 25 and the rotating electrical machine 200 equipped with the rotor 40. The same advantage can be obtained with the other terminal portions 25*f* including the coil connection portions 251*f* through 253*f*.

Figure 20:
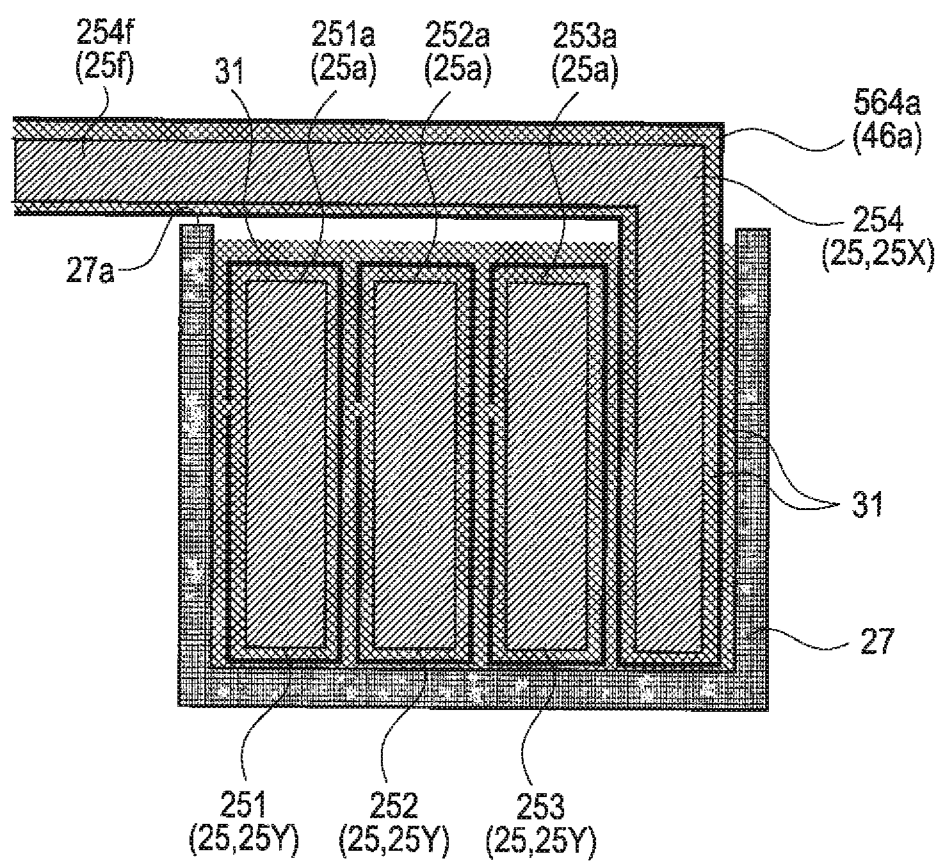
FIG. 20 is a cross section of a sheet-like insulation member 564*a* (56*a*) as a modification of a sheet-like insulation member 464*a* (46*a*) shown in FIG. 18.
Figure 21:
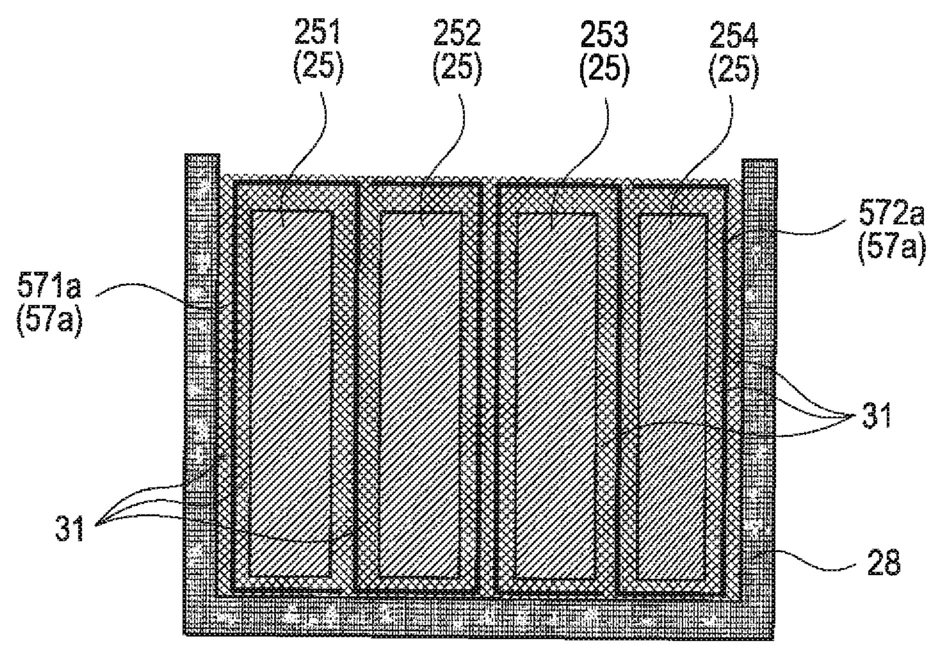
FIG. 21 is a cross section of a sheet-like insulation member 57*a* as another modification of the sheet-like insulation member 46*a* shown in FIG. 15.

The second embodiment has described a case where spaces between the coil connection portion 254*f* (terminal portion 25*f*) of the neutral point bus bar 254 and the axial end faces 253*a* through 251*a* of the W-phase bus bar 253 through the U-phase bus bar 251, respectively, are covered with the aramid paper sheets 463*a* through 461*a* covering the axial end faces 253*a* through 251*a* of the W-phase bus bar 253 through the U-phase bus bar 251, respectively. It should be appreciated, however, that the invention is not limited to this case. It may be configured in such a manner as is shown in FIG. 20 that not only the both radial side surfaces 254*b* and the axial end face 254*c* of the neutral point bus bar 254, but also the coil connection portion 254*f* (terminal portion 25*f*) is covered with an aramid paper sheet 564*a* (sheet-like insulation member 56*a*). By covering the terminal portion 254*f* of the neutral bus bar 254 at least in the portion opposed across the axial end faces 253*a* through 251*a* of the bus bars (W-phase bus bar 253, the V-phase bus bar 252, and the U-phase bus bar 251, respectively) different from the neutral point bus bar 254 with the aramid paper sheet 564*a*, it becomes possible to provide the stator 40 that can be more compact while maintaining insulation reliability between the bus bars 25 and the rotating electrical machine 200 equipped with the stator 40. The same advantage can be obtained with the other terminal portions 25*f* including the coil connection portions 251*f* through 253*f*. Alternatively, it may be configured in such a manner that an insulation member different from the sheet-like insulation member 46*a* described above is provided separately as a member covering a space between the terminal portion 25*f* of the bus bar 25X in a portion opposed across the axial end face 25*a* of the bus bar 25Y and the axial end face 25*a* of the bus bar 25Y, and the space therebetween is covered by the insulation member 32. Also, as with the first embodiment above, it may be configured in such a manner that the stator coil 23 is located on the outer peripheral side of the bus bar 25 and the coil connection portion extends radially outward and is connected to one end of the stator coil 23. Also, it may be configured in such a manner that the feed portion 25*e* protruding in the axial direction from the axial end face 25*a* of each bus bar 25 extends in the radial direction as with the coil connection portion and is connected to the power conversion circuit.

Also, the stator 40 according to the second embodiment of the invention is configured in such a manner that the bus bar 25 and the sheet-like insulation member 46*a* are bonded to each other with the adhesive 31. Accordingly, the bus bar 25 and the sheet-like insulation member 46*a* can be brought into close contact with each other. It thus becomes possible to provide the stator 40 having further enhanced insulation reliability between the bus bars 25 and the rotating electrical machine 200 equipped with the stator 40.

Further, the stator 40 according to the second embodiment of the invention is configured in such a manner that stator 40 includes the holder 27 holding the bus bars 25 and that the sheet-like insulation member 46*a* covering the both side surfaces 25*b* and the both axial end faces 25*a* and 25*c* of each bus bar 25 is bonded to the holder 27 with the adhesive 31. Hence, not only can the bus bars 25 be fixed within the holder 27 in a more reliable manner, but also the positions of the respective bus bars 25 can be fixed. It thus becomes possible to provide the stator 40 having further enhanced insulation reliability between the bus bars 25 and the rotating electrical machine 200 equipped with the stator 40.

Furthermore, the second embodiment has described a case where the sheet-like insulation member 46*a* covering the both radial side surfaces 25*b* and the both axial end faces 25*a* and 25*c* of the bus bar 25 is formed of the four aramid paper sheets 461*a* through 464*a* as is shown in FIG. 15 and the aramid paper sheets 461*a* through 464*a* cover the bus bars 251 through 254, respectively, in a one-to-one correspondence. It should be appreciated, however, that the invention is not limited to this case. For example, it may be configured in such a manner as is shown FIG. 21 that an insulation member 57 is formed of a sheet-like insulation member 57*a* and the sheet-like insulation member 57*a* is formed of two aramid paper sheets 571*a* and 572*a*, so that the U-phase bus bar 251 and the V-phase bus bar 252 are covered with one aramid paper sheet 571*a* and the W-phase bus bar 253 and the neutral point bus bar 254 are covered with one aramid paper sheet 572*a*. In the case shown in FIG. 21, the aramid paper sheet 571*a* not only covers the axial end face 251*c* of the U-phase bus bar 251 and the axial end face 252*a* of the V-phase bus bar 252, but also continuously covers a radial side surface between the U-phase bus bar 251 and the V-phase bus bar 252 (between adjacent bus bars) while covering the axial end face 251*a* of the U-phase bus bar 251, the axial end face 252*c* of the V-phase bus bar 252, and the both radial side surfaces 251*b* and 252*b* of the U-phase bus bar 251 and the V-phase bus bar 252, respectively. Also, the aramid paper sheet 572*a* not only covers the axial end face 253*c* of the W-phase bus bar 253 and the axial end face 254*a* of the neutral point bus bar 254, but also continuously covers a radial side surface between the W-phase bus bar 253 and the neutral point bus bar 254 (between adjacent bus bars) while covering the axial end face 253*a* of the W-phase bus bar 253, the axial end face 254*c* of the neutral point bus bar 254, and the both radial side surfaces 253*b* and 254*b* of the W-phase bus bar 253 and the neutral point bus bar 254, respectively. In comparison with the case where the sheet-like insulation member 46*a* is formed of four aramid paper sheets 461*a* through 464*a*, the cost is reduced because the number of components is reduced. Moreover, because the radial side surfaces between the adjacent bus bars (between the bus bars 251 and 252 and between the bus bars 253 and 254) are covered continuously by the respective aramid paper sheets 571*a* and 572*a*, movements of the respective bus bars 251 through 254 in the axial direction can be restricted in the event of vibrations. It thus becomes possible to provide the stator 40 with enhanced vibration resistance and the rotating electrical machine 200 equipped with the stator 40.

The rotating electrical machines 100 and 200 described, respectively, in the first and second embodiments of the invention above are a typical rotating electrical machine including the rotor 10 and the stator 20 or the rotor 10 and the stator 40 and are applicable not only to a drive motor (electric motor) equipped with the stator having the configurations of the invention, but also to a power generator, such as an alternator, and a motor generator furnished with functions of an electric motor and a power generator.

REFERENCE SIGNS LIST

10: rotor, 20 and 40: stator, 21: stator core, 21*a*: yoke portion, 21*b*: teeth portion, 22: bobbin, 23, 231, 232, and 233: stator coil (stator wiring), 24: core holder, 25, 251, 252, 253, and 254: bus bar, 25*a* and 25*c*: axial end face, 25*b*: radial side surface, 25*e*: feed portion (terminal portion), 25*f* and 25*g*: coil connection portion (terminal portion), 26, 36, 37, 38, 46, 47, 48, 56, and 57: insulation member, 26*a*, 36*a*, 37*a*, 38*a*, 46*a*, 47*a*, 48*a*, 56*a*, 57*a*, 261*a*, 262*a*, 263*a*, and 264*a*: sheet-like insulation member, 26*b*: bonding member (bonding member having insulation properties), 27, 28, and 29: holder, 27*a*: axial end face, 27*b*: holding groove, 31: adhesive, 60: rotor shaft, 70: frame, 100 and 200: rotating electrical machine, 26*a*1, 46*a*1, 47*a*1, and 48*a*1: both end portions

The invention claimed is:

1. A stator comprising:

a stator core formed in an annular shape to a rotation shaft;

a stator coil wound on teeth portions of the stator core;

a plurality of plate-like bus bars each electrically connected to terminal of the stator coils and formed in an annular shape at an outer periphery side of the stator core;

an insulating holder which holds the bus bars at the state in which the plate-like surface of each bus bar is radially laminated to each other in a direction toward the rotation shaft;

an insulation member which insulates and holds the bus bars in the insulating holder, wherein;

the insulation member comprising:

a sheet-like insulation member which is folded to continuously extend to and at least partially cover both radial side surfaces and at least one of the axial end faces of each bus bar and extends a circumferential direction; and an insulating bonding member filled in a space among the sheet-like insulation members, the bus bars, and the holder.

2. The stator according to claim 1, wherein;

the insulating bonding member covers at least the other of the axial end faces of each bus bar and bonds ends of the sheet-like insulation members to each other.

3. The stator according to claim 1, wherein;

the both ends of the sheet-like insulation members are arranged so as to oppose at the radial side surfaces of the bus bar.

4. The stator according to claim 1, wherein;

the both ends of the sheet-like insulation members are arranged so as to oppose at the axial end faces of the bus bar.

5. The stator according to claim 1, wherein;

the sheet-like insulation member continuously covers radial side surfaces between the bus bars laminated adjacently.

6. The stator according to claim 1, wherein;

a terminal portion is provided protruding in the axial direction from the axial end faces of the at least one of the bus bars and further extending radially along the axial end faces of the rest of bus bars, and an insulation member is provided to cover a space between the terminal and the axial end faces of the rest of bus bars.

7. A rotating electrical machine, comprising: the stator set forth in claim 1, and a rotor installed oppositely to the stator in a rotatable manner.

8. The stator according to claim 1, wherein the bonding element is disposed in a space between each sheet-like member and the bus bar whose side surfaces the sheet-like member continuously extends to.

9. The stator according to claim 1, wherein the bonding element is disposed in a space between adjacent bus bars.

* * * * *